US012640651B2

(12) United States Patent
Beig et al.

(10) Patent No.: US 12,640,651 B2
(45) Date of Patent: May 26, 2026

(54) BIDIRECTIONAL DC-DC CONVERTER

(71) Applicant: Khalifa University of Science and Technology, Abu Dhabi (AE)

(72) Inventors: Balanthi Mogru Abdul Rahiman Beig, Abu Dhabi (AE); Motiur Reza Mohammed, Abu Dhabi (AE); Khaled Ali Mohammed Al Jaafari, Abu Dhabi (AE); Khalifa Hassan Al Hosani, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 212 days.

(21) Appl. No.: 18/699,679

(22) PCT Filed: Oct. 21, 2021

(86) PCT No.: PCT/IB2021/059737
§ 371 (c)(1),
(2) Date: Apr. 9, 2024

(87) PCT Pub. No.: WO2023/067376
PCT Pub. Date: Apr. 27, 2023

(65) Prior Publication Data
US 2024/0405680 A1     Dec. 5, 2024

(51) Int. Cl.
H02M 1/38          (2007.01)
B60L 50/40         (2019.01)
(Continued)

(52) U.S. Cl.
CPC .......... H02M 3/1582 (2013.01); B60L 50/40 (2019.02); H02M 1/36 (2013.01); H02M 3/06 (2013.01);
(Continued)

(58) Field of Classification Search
CPC ........ H02M 3/1582; H02M 3/06; H02M 1/36; B60L 50/40; B60L 2210/12; B60L 2210/14
See application file for complete search history.

(56) References Cited

U.S. PATENT DOCUMENTS

| | | | |
|---|---|---|---|
| 12,081,111 B2 * | 9/2024 | Beig ........................ | H02M 3/07 |
| 2015/0303803 A1 | 10/2015 | Chen et al. | |
| 2017/0012452 A1 * | 1/2017 | Kang ........................ | H02J 7/00 |

FOREIGN PATENT DOCUMENTS

| | | |
|---|---|---|
| DE | 102007060952 A1 | 6/2009 |
| EP | 3301799 A1 | 4/2018 |
| WO | 2021181273 A1 | 9/2021 |

OTHER PUBLICATIONS

PCT/IB2021/059737 , "International Search Report and Written Opinion", Jul. 8, 2022, 10 pages.

* cited by examiner

*Primary Examiner* — Adolf D Berhane
(74) *Attorney, Agent, or Firm* — Kilpatrick Townsend & Stockton LLP

(57) ABSTRACT
A bidirectional direct current-to-direct current (DC-DC) converter includes a converter (500), which can be operated as a boost or buck converter, and a control unit. The converter (500) consists of a set of inductors (L1, L2), a set of capacitors (C1, C2), and a set of switches (GS1-GS5). The control unit can be configured to activate the converter (500) as boost converter by turning ON first switches (GS2, GS3) of the set of switches and turning OFF remaining second switches (GS1, GS4, GS5) of the set of switches. The control unit can be configured to activate the converter as the buck converter by turning OFF the first switches (GS2, GS3) and turning ON (GS1, GS4, GS5) the remaining second switches.

20 Claims, 36 Drawing Sheets

(51) Int. Cl.
    *H02M 1/36*       (2007.01)
    *H02M 3/06*       (2006.01)
    *H02M 3/158*     (2006.01)

(52) U.S. Cl.
    CPC ....... *B60L 2210/12* (2013.01); *B60L 2210/14*
                                    (2013.01)

1200

3000a

3000b

3000c

3000d

3000e

3100

3500

BIDIRECTIONAL DC-DC CONVERTER

This application is a National Stage Entry under 35 U.S.C. 371 of PCT Application No. PCTIB2021059737 filed Oct. 21, 2021, the entire contents of which are hereby incorporated for all purposes in their entirety.

BACKGROUND OF THE INVENTION

DC to DC converters are used in wide variety of applications such as DC power supplies, renewable energy sources, battery powered systems, battery powered electric vehicles (EV), hybrid electric vehicles (HEV), electric vehicle chargers, uninterrupted power supplies regenerative drives, and wireless chargers. The converters can include buck types, boost types or buck boost types. In various applications, bidirectional power flow can be required. Accordingly, a DC-DC converter may be in a positon to work as a voltage boost in one direction, and a voltage buck in a reverse direction.

BRIEF DESCRIPTION OF THE DRAWINGS

Various embodiments in accordance with the present disclosure will be described with reference to the drawings, in which.

DETAILED DESCRIPTION OF THE INVENTION

Figure 1:
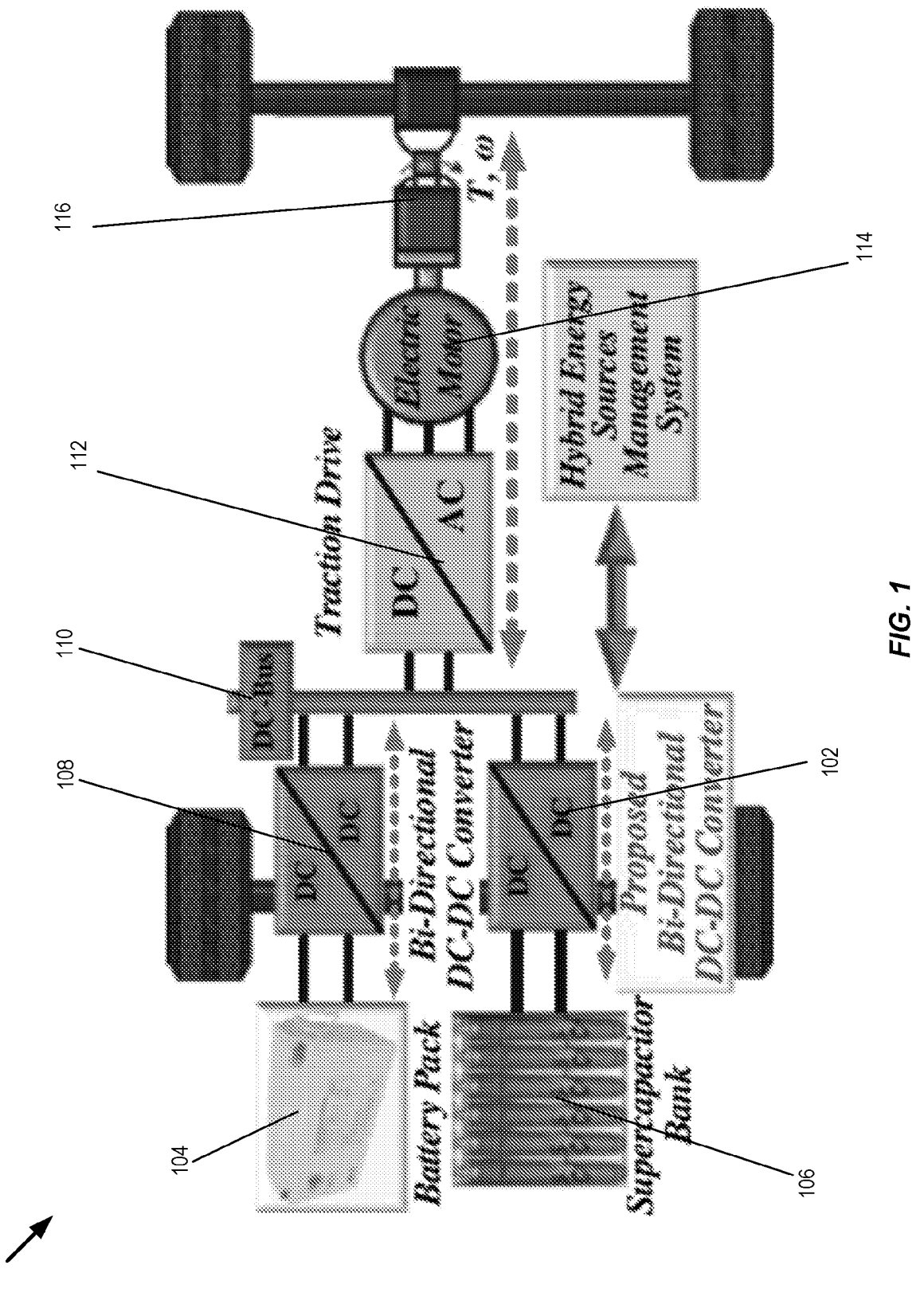
FIG. 1 is a schematic of a battery-driven electric vehicle with a bidirectional DC-DC converter.

In the following description, various embodiments will be described. For purposes of explanation, specific configurations and details are set forth in order to provide a thorough understanding of the embodiments. However, it will also be apparent to one skilled in the art that the embodiments may be practiced in other configurations, or without the specific details. Furthermore, well-known features may be omitted or simplified in order not to obscure the embodiment being described.

Conventional DC-DC converters are mainly unidirectional and a voltage factor may be limited to three for boost converter and a third for buck converter. An efficiency of the conventional DC-DC converter decreases drastically at higher gain. For higher voltage gain, a cascaded DC-DC converter may be used, which not only reduces the efficiency of the system but also results in poor reliability. In systems such as regenerative braking systems in EVs, regenerative electric drives, grid-connected solar power systems with bidirectional power flow, electric vehicle chargers, grid-connected battery storage systems and grid to vehicle-vehicle to grid (G2V-V2G) systems, bidirectional and high gain DC-DC converters may be ideal.

Different topologies of high gain DC-DC converters can be based on coupled inductors, switched inductors, switched capacitors, combined switched inductors and switched capacitors, voltage multiplier cells, Z-source, quasi Z-source and interleaved inductor can be used. In couple inductors-based DC-DC converters, leakage inductance of coupled inductors can increase voltage spikes, which can further increase the voltage stress across devices. Furthermore, leakage inductance can decrease the efficiency. Alternatively, high voltage gain can be achieved through switched capacitor and switched inductor networks. The switched capacitor-based converters use one or more capacitors to store energy and transfer the energy to an output side. The charging and discharging of capacitors increases an instantaneous current. The combined switched inductor techniques and switched capacitor techniques in a multistage combination can be used for high gain. However, the complex network and large component counts increase the cost and size of the converter and reduces the reliability thereof. For example, the multistage combination can be more difficult to install in a vehicle, can weigh more (e.g., yielding less fuel efficiency), can take up more space, etc. Additionally, the multistage combination may require more maintenance and be characterized by a lower operational lifetime.

Other topologies based on Z source, qZSI and interleaved can be used for the high gain DC-DC converter. However, these converters have several limitations such as (i) a limited range of operational duty ratio, (ii) a limited voltage gain range, etc. In order to achieve high gain, with reduced number of components and lesser number of required sensors for control, a bidirectional DC-DC converter with high voltage gain can be used. The converter can include five switches, two inductors, and two capacitors. The converter can include other suitable components. To operate the convert in boost mode, various pulse width modulation (PWM) techniques can be used. In a reverse power flow, the circuit acts as buck converter and two PWM techniques for buck mode operation can be used. The two inductors can share current equally (e.g., independent of duty cycle). Therefore, the bidirectional DC-DC converter can operate with one current sensor.

FIG. 1 is a schematic of a battery-driven electric vehicle (EV) 100 with a bidirectional DC-DC converter 102. In some examples, the EV can instead be a hybrid electric vehicle (HEV). The EV 100 can include a power system that can supply and control power to one or more motors of the EV 100. In an example, the power system includes a battery pack 104, a super capacitor bank 106, and other suitable components. In examples in which the EV 100 is the HEV, the power supply can additionally include a hybrid energy source management system or other suitable hybrid component. Generally, the battery pack 104 can be electrically coupled to a DC-DC converter 108 (which can have the same configuration as the bidirectional DC-DC converter 102) that is, in turn, electrically coupled to a DC-bus 110. The super capacitor bank 106 can be electrically coupled to the bidirectional DC-DC converter 102 that is, in turn, electrically coupled to the DC-bus 110. The DC-bus 110 can be electrically coupled to a DC-AC converter 112 that can be electrically coupled to an electric motor 114 that can use AC electricity from the DC-AC converter 112 to drive a shaft 116 or other suitable component for causing the EV 100 to move. In the EV 100, the bidirectional DC-DC converter 102 may receive electrical power from the super capacitor bank 106 and supply (e.g., via the DC-bus 110) electrical power to the DC-AC converter 112. Additionally, the bidirectional DC-DC converter 102 may receive (e.g., via the DC-bus 110) electrical power from the DC-AC converter 112 and supply power to the super capacitor bank 106.

Figure 2:
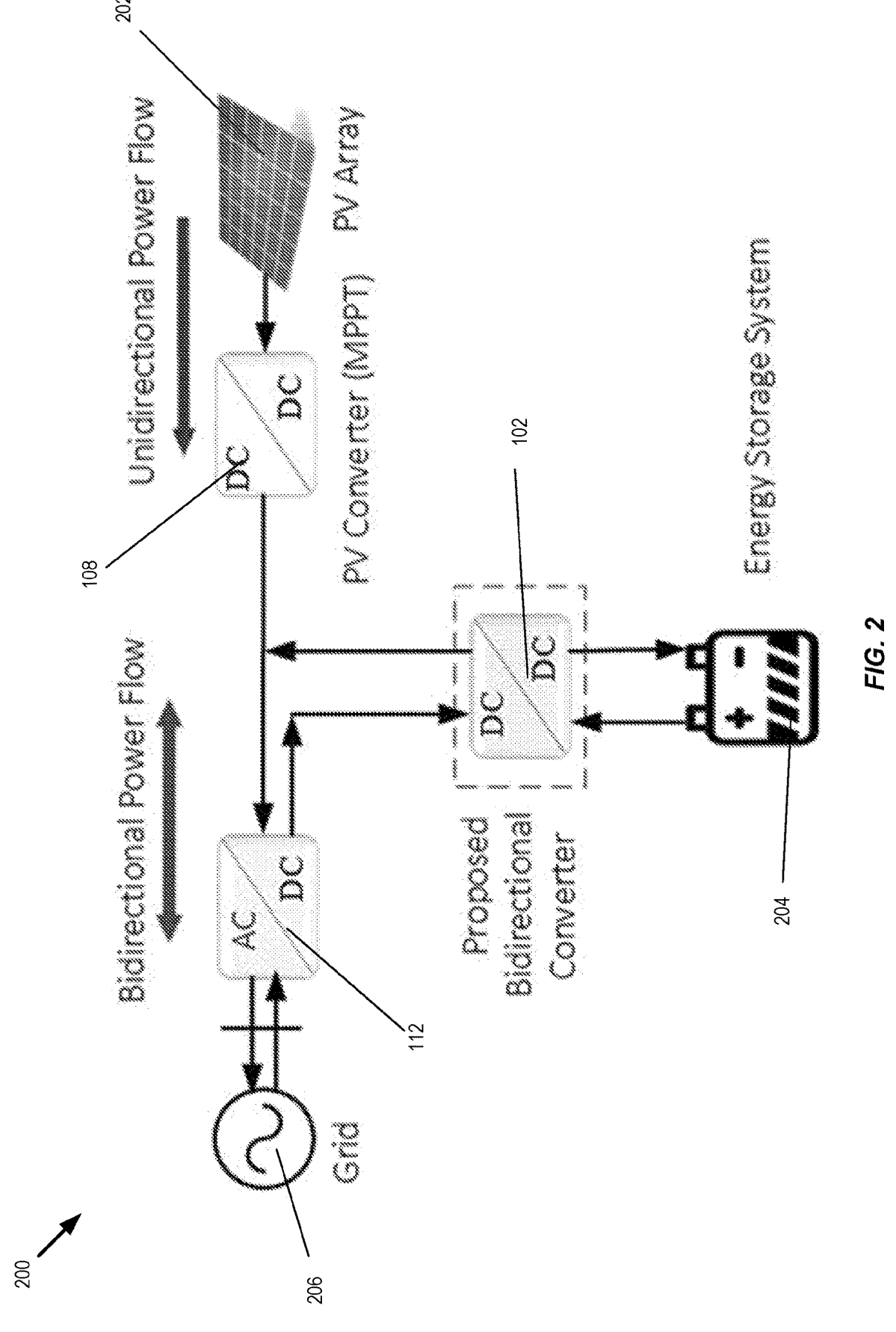
FIG. 2 is a schematic of a grid-connected renewable energy source with a bidirectional DC-DC converter.

FIG. 2 is a schematic of a grid-connected renewable energy source system 200 with a bidirectional DC-DC converter 102. The grid-connected renewable energy source system 200 can include a renewable energy source 202, a DC-DC converter 108, a DC-AC converter 112, an energy storage system 204, a grid 206 (e.g., an electrical grid provided by a power company, etc.), and the bidirectional DC-DC converter 102. The renewable energy source 202 can include components for solar power, components for wind power, components for geothermal power, or other suitable components for generating renewable energy. The renewable energy source 202 can be electrically coupled to the DC-DC converter 108 that can, in turn, be electrically coupled to the DC-AC converter 112 that can, in turn, be electrically coupled to the grid 206. The DC-AC converter 112 can additionally be electrically coupled to the bidirectional DC-DC converter 102 that can, in turn, be electrically coupled to the energy storage system 204. The bidirectional DC-DC converter 102 can receive electrical power from the DC-AC converter 112 and supply electrical power to the energy storage system 204. Additionally, the bidirectional DC-DC converter 102 can receive electrical power from the energy storage system 204 and supply electrical power to the DC-AC converter 112.

Figure 3:
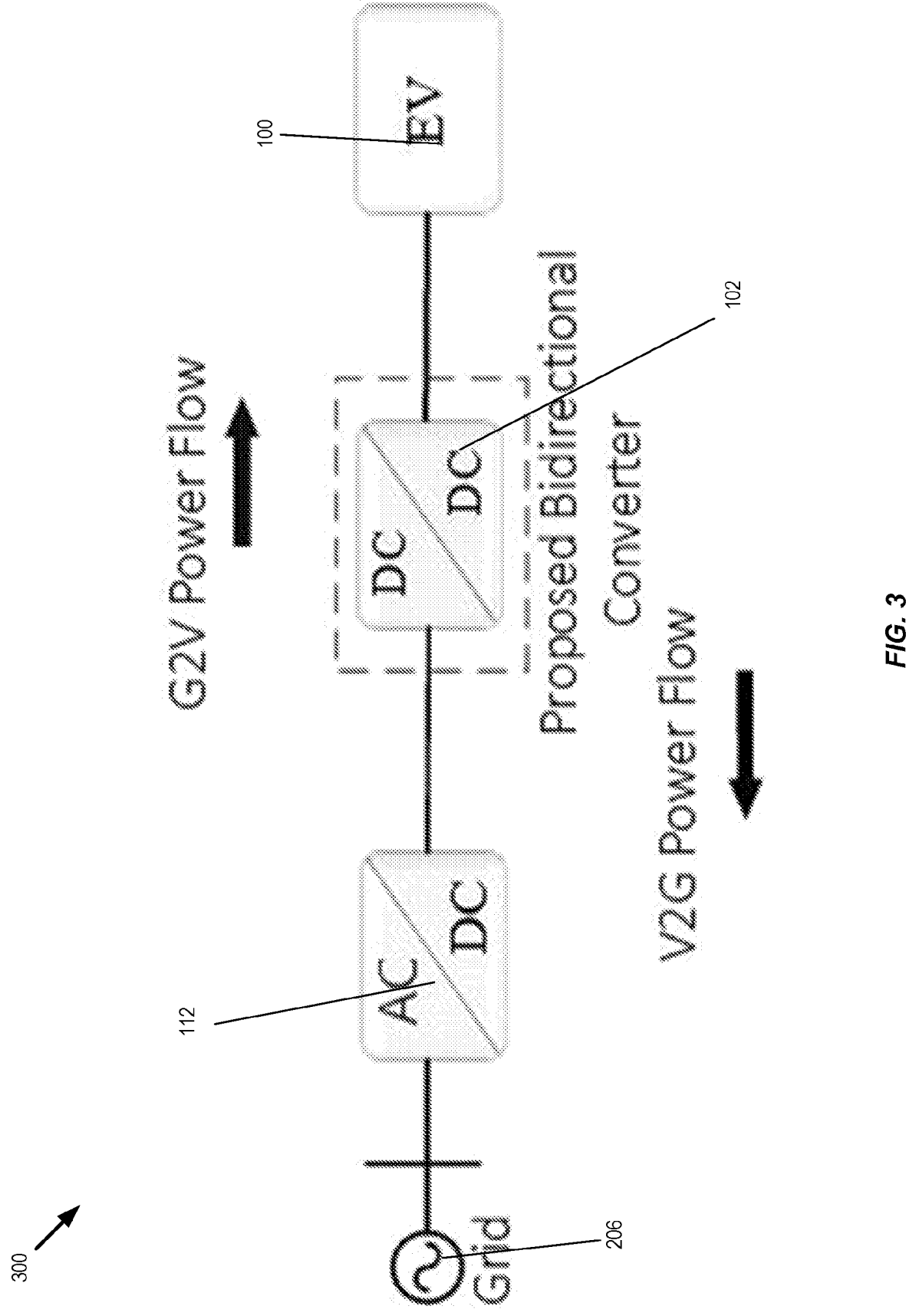
FIG. 3 is a schematic of a grid-to-vehicle and vehicle-to-grid electrical system with a bidirectional DC-DC converter.

FIG. 3 is a schematic of a grid-to-vehicle and vehicle-to-grid electrical system 300 with a bidirectional DC-DC converter 102. The system can include an EV 100 (e.g., the EV or HEV described with respect to FIG. 1), the bidirectional DC-DC converter 102, a DC-AC converter 112, and a grid 206 (e.g., the grid 206 described with respect to FIG. 2). The EV 100 can be electrically coupled to the bidirectional DC-DC converter 102 that can, in turn, be electrically coupled to the DC-AC converter 112 that can, in turn, be electrically coupled to the grid 206. The bidirectional DC-DC converter 102 can receive electrical power from the DC-AC converter 112 and supply electrical power to the EV 100. Additionally, the bidirectional DC-DC converter 102 can receive electrical power from the EV 100 and supply electrical power to the DC-AC converter 112.

Figure 4:
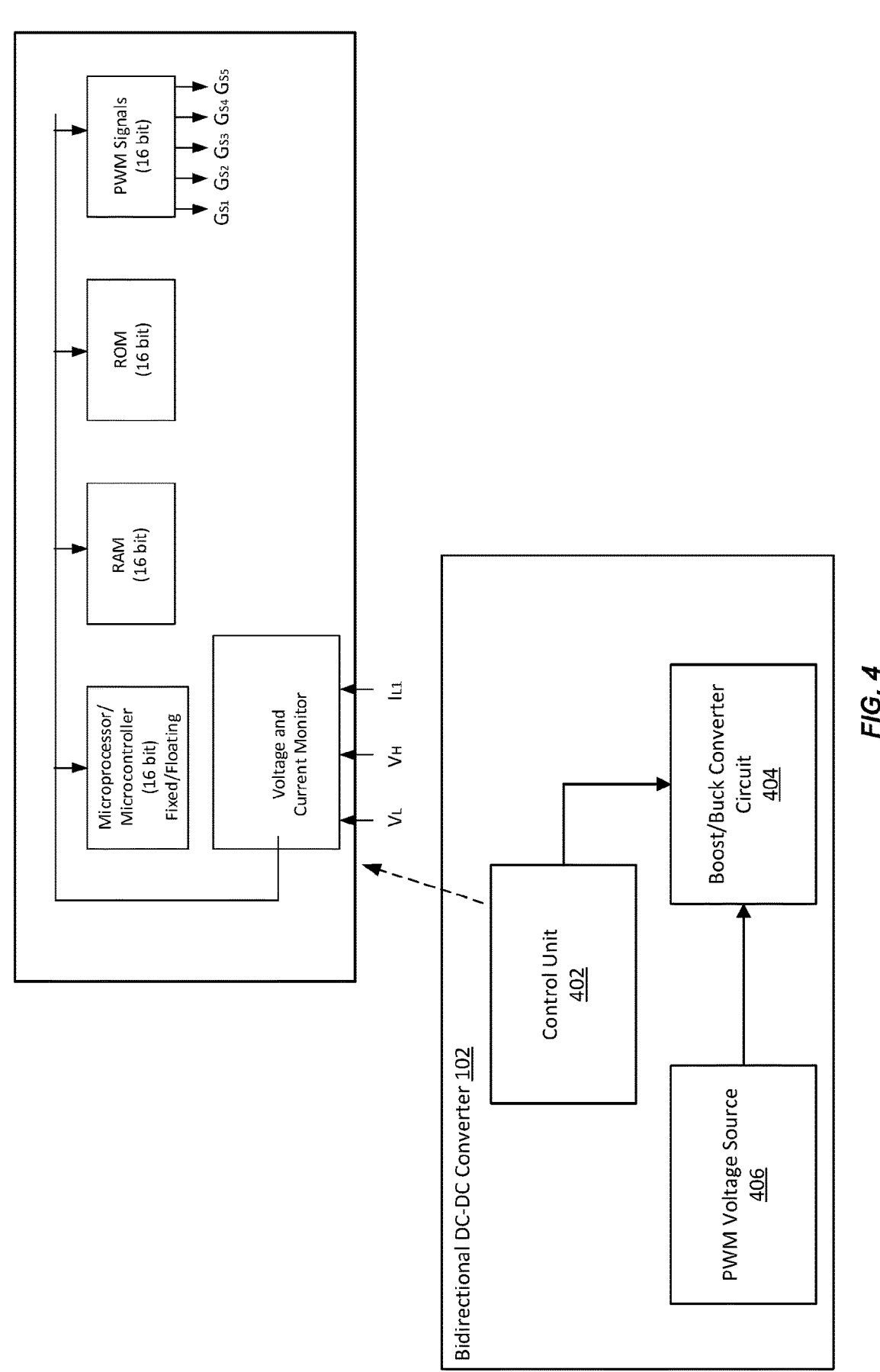
FIG. 4 is a block diagram of a bidirectional DC-DC converter.

FIG. 4 is a block diagram of a bidirectional DC-DC converter 102. The bidirectional DC-DC converter 102 can include a control unit 402, a boost/buck converter circuit 404, and a pulse width modulation (PWM) voltage source 406, among other suitable components. The control unit 402 can control operations of the bidirectional DC-DC converter 102. For example, the control unit 402 can select, based on a signal from a vehicle system, a boost operational mode or a buck operational mode of the bidirectional DC-DC converter 102. In some examples, the control unit 402 can control the operations by turning switches ON and OFF switches of the of the boost/buck converter circuit 404 such that PWM pulses can be supplied from the PWM voltage source 406 to the circuit via the turned ON switches. As illustrated in the following figures, the circuit of the bidirectional DC-DC converter 102 and techniques for turning the switches ON and OFF are illustrated as example implementations.

The control unit 402 can include hardware or a combination of hardware and software configured to control some or all of the operations of the bidirectional DC-DC converter 102. An example implementation of the control unit 402 is disclosed in the top right corner of FIG. 4. As illustrated, the control unit 402 includes in this example a voltage and current monitor, a microprocessor and/or microcontroller, a random-access memory (RAM), a read-only memory (ROM), and a PWM signals unit. The voltage and current monitor can receive measurements or detect different voltages and/or currents, such as a low voltage side ($V_L$), a high voltage side ($V_H$), and a current across an inductor ($I_{L1}$). Such voltage sides and inductor are further described in the next figures. The microprocessor/microcontroller receive and process the output of the voltage and current monitor to output digital data regarding the measurements, where such data can be stored and can be used to control the output of the PMW signals unit. Any microprocessor, microcontroller, and/or ASIC based digital controller can be used. The control software can be developed using any programming language, such as C language and/or any higher level language such as MATLAB/SIMULINK can be used to program the above system. A cross compiler to generate appropriate C program can be used to transfer the program to microprocessor. The output of the PMW signals unit can set the PMW signals across different switches (which can be implemented as to include transistors). These signals are illustrated as $G_{S1}$, $G_{S2}$, $G_{S2}$, $G_{S4}$, and $G_{S5}$ and are in reference to the corresponding transistors shown in the next figures.

Figure 5:
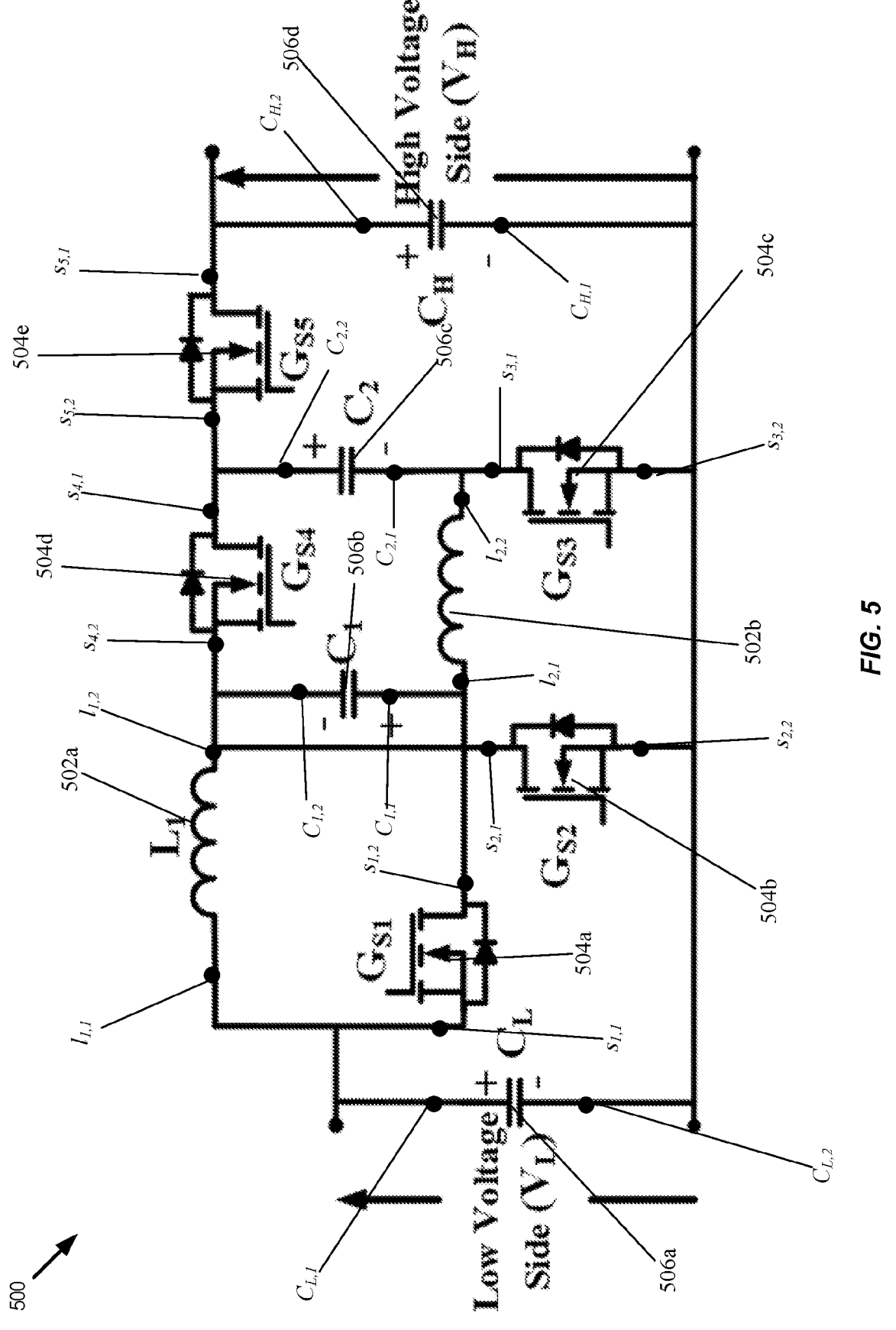
FIG. 5 is a circuit diagram of a bidirectional DC-DC converter.

FIG. 5 is a schematic of a circuit 500 of a bidirectional DC-DC converter 102. The circuit 500 can include various capacitors, inductors, switches, and other components that can be included in the bidirectional DC-DC converter 102. In some examples, each switch, $G_{Si}$, includes a transistor and a diode. The transistor can be an N-channel metal oxide semiconductor field effect transistor (MOSFET). The diode is connected across the body of the transistor, such as between the drain (D) and source(s) terminals of the MOSFET, with the positive polarity of the diode connected to the source (S) and the negative polarity of the diode connected to the drain (D). And, the gate (G) of the transistor is connected to a PWM voltage source.

The bidirectional DC-DC converter 102 can include inductors 502*a*-*b*, switches 504*a*-*e*, and capacitors 506*a*-*d*. The inductor 502*a* can be inductor $L_1$, and the inductor 502*b* can be inductor $L_2$. The switch 504*a* can be switch $G_{S1}$, the switch 504*b* can be switch $G_{S2}$, the switch 504*c* can be switch $G_{S3}$, the switch 504*d* can be switch $G_{S4}$, and the switch 504*e* can be switch $G_{S5}$. The capacitor 506*a* can be capacitor $C_L$, the capacitor 506*b* can be capacitor $C_1$, the capacitor 506*c* can be capacitor $C_2$, the capacitor 506*d* can be capacitor $C_H$.

Each inductor, switch, and capacitor can include a first end and a second end. For example, a first end (shown as "$l_{1,1}$") of the inductor $L_1$ is electrically connected to a first end (shown as "$S_{1,1}$") of the switch $G_{S1}$. A second end (shown as "$l_{1,2}$") of the first inductor $L_1$ is electrically coupled to a first end (shown as "$s_{2,1}$") of the switch $G_{S2}$. A first end (shown as "$l_{2,1}$") of the inductor $L_2$ is electrically connected to $s_{1,2}$, and to a first end (shown as "$C_{1,1}$") of the capacitor $C_1$. A second end (shown as "$l_{2,2}$") of the inductor $L_2$ is electrically connected to a first end (shown as "$s_{3,1}$") of the switch $S_3$ and to a first end (shown as "$C_{2,1}$") of the capacitor $C_2$. A first side (shown as "$C_{L,1}$") of the capacitor $C_L$ is electrically connected to $l_{1,1}$ and $s_{1,1}$. The second end (shown as "$C_{L,2}$") of the capacitor $C_L$ is electrically connected to a second end (shown as "$s_{2,2}$") of the switch $G_{S2}$, to a second end (shown as "$s_{3,2}$") of the switch $G_{S3}$, and to a first end (shown as "$C_{H,1}$") of the capacitor $C_H$. A second end (shown as "$C_{H,2}$") of the capacitor $C_H$ is electrically connected to a first end (shown as "$s_{5,1}$") of the switch $G_{S5}$. A second end (shown as "$s_{5,2}$") of the switch $G_{S,5}$ is electrically connected to a second end (shown as "$C_{2,2}$") of the capacitor $C_2$ and to a first end (shown as "$s_{4,1}$") of the switch $G_{S5}$. A second end (shown as "$s_{4,2}$") of the switch $G_{S4}$ is electrically connected to $l_{1,2}$ and to a second end (shown as "$C_{1,2}$") of the capacitor $C_1$. Other suitable electrical connections and electrical couplings in the bidirectional DC-DC converter 102 are possible.

In some examples, the switches $G_{S1}$, $G_{S4}$, and $G_{S5}$ can be a first set of switches, and the switches $G_{S2}$ and $G_{S3}$ can be a second set of switches. The bidirectional DC-DC converter 102 can independently operate the first set of switches and the second set of switches. For example, in a buck operational mode, the bidirectional DC-DC converter 102 can turn ON the first set of switches and turn OFF the second set of switches, and, in a boost mode, the bidirectional DC-DC converter 102 can turn OFF the first set of switches and turn ON the second set of switches.

The bidirectional DC-DC converter 102 can operate in the boost mode or in the buck mode. In a voltage boost operational mode, the bidirectional DC-DC converter 102 can operate in three (or other suitable amounts of) PWMs. For example, a type I PWM operation can involve a first range of gain (e.g., from 5.83 to 21 or other suitable ranges), a type II PWM operation can involve a second range of gain (e.g., from two to 20 or other suitable ranges), and a type III can involve a third range of gain (e.g., up to 30 or other suitable values). The duty cycle of each type of PWM operation can include a wide range of values (e.g., 0.05 to 0.5 or other suitable ranges). In a voltage buck operational mode, the bidirectional DC-DC converter 102 can operate in two (or other suitable amounts of) PWMs. For example, a type I PWM operation can involve a first voltage buck gain range (e.g., 0.05 to 0.172 or other suitable ranges), and a type II PWM operation can involve a second voltage buck gain range (e.g., 0.01 to 0.5 or other suitable ranges).

The bidirectional DC-DC converter 102 can be improved over other DC-DC converters. An input terminal and an output terminal of the bidirectional DC-DC converter 102 can include a common ground, which can mitigate or eliminate leakage current and any isolation issues. Additionally, by using different PWM types, an efficiency of the bidirectional DC-DC converter 102 can be improved for a controlled voltage gain. The bidirectional DC-DC converter 102 can be characterized by a low input current ripple. Current sharing for PWM types I and II can be equal and the current sharing ratio for PWM type III can be 1:2. Accordingly, only one current sensor can be used in the bidirectional DC-DC converter 102. The bidirectional DC-DC converter 102 includes less components, is lighter, is smaller, and is more reliable than other DC-DC converters.

While illustrated in FIG. 5 having five switches, two inductors, two intermediate capacitors, and two capacitors at end terminals, the bidirectional DC-DC converter 102 can include other suitable components. The bidirectional flow of power in the bidirectional DC-DC converter 102 can be controlled by selecting switches, operational modes, and PWM types of the bidirectional DC-DC converter 102. For instance, in a boost operational mode, two out of five switches are controlled (e.g., the first set of switches are turned off), while for the buck operational mode, three switches are controlled (e.g., the second set of switches are turned off) using various PWM types.

During the boost operational mode, the first set of switches (e.g., $G_{S1}$, $G_{S4}$, and $G_{S5}$) may be turned off permanently. PWM pulses can be transmitted over the second set of switches (e.g., $G_{S2}$ and $G_{S3}$). Accordingly, the boost operational mode may involve energy transfer with the second set of switches and diodes of the first set of switches. T can be a switching time period, and the ON time, $T_{ON}$=DT, where D is the duty cycle given by $$D = \frac{T_{ON}}{T}$$

and (1-D)T is an OFF time. The boost operational mode can be operation with various PWM techniques.

In a boost operational mode with PWM type I, a pulse can be generated for the switches GS2 and GS3 and can be complementary. The gain can be parabolic in nature, and a value of the practically attainable gain can be up to 21. In a boost operational mode with PWM type II, the switches GS2 and GS3 can be synchronized, and a practical gain can range between 2 and 20. In a boost operational mode with PWM type III, pulses for the switches $G_{S2}$ and $G_{S3}$ can be out of phase (e.g., 180° or other suitable degree measure for being out of phase). Two zones of operation can exist in this mode and type. For example, a duty ratio can be less than 0.5 (i.e., there is no overlapping of the $G_{S2}$ and $G_{S3}$ gate pulses). Alternatively, the duty ratio can be greater than 0.5 (i.e., some duration exists such that the gate pulses $G_{S2}$ and $G_{S3}$ are overlapping). However, at a low duty ratio, the voltage across the capacitor can be zero, and this can cause body diodes of $G_{S1}$ and $G_{S2}$ to conduct. Accordingly, PWM type III can be divided into three regions of operation: a first zone: $0.5 \leq D \leq 1$, a second zone $0.33 \leq D \leq 0.5$, and a third zone: $0 \leq D \leq 0.33$.

Figure 6:
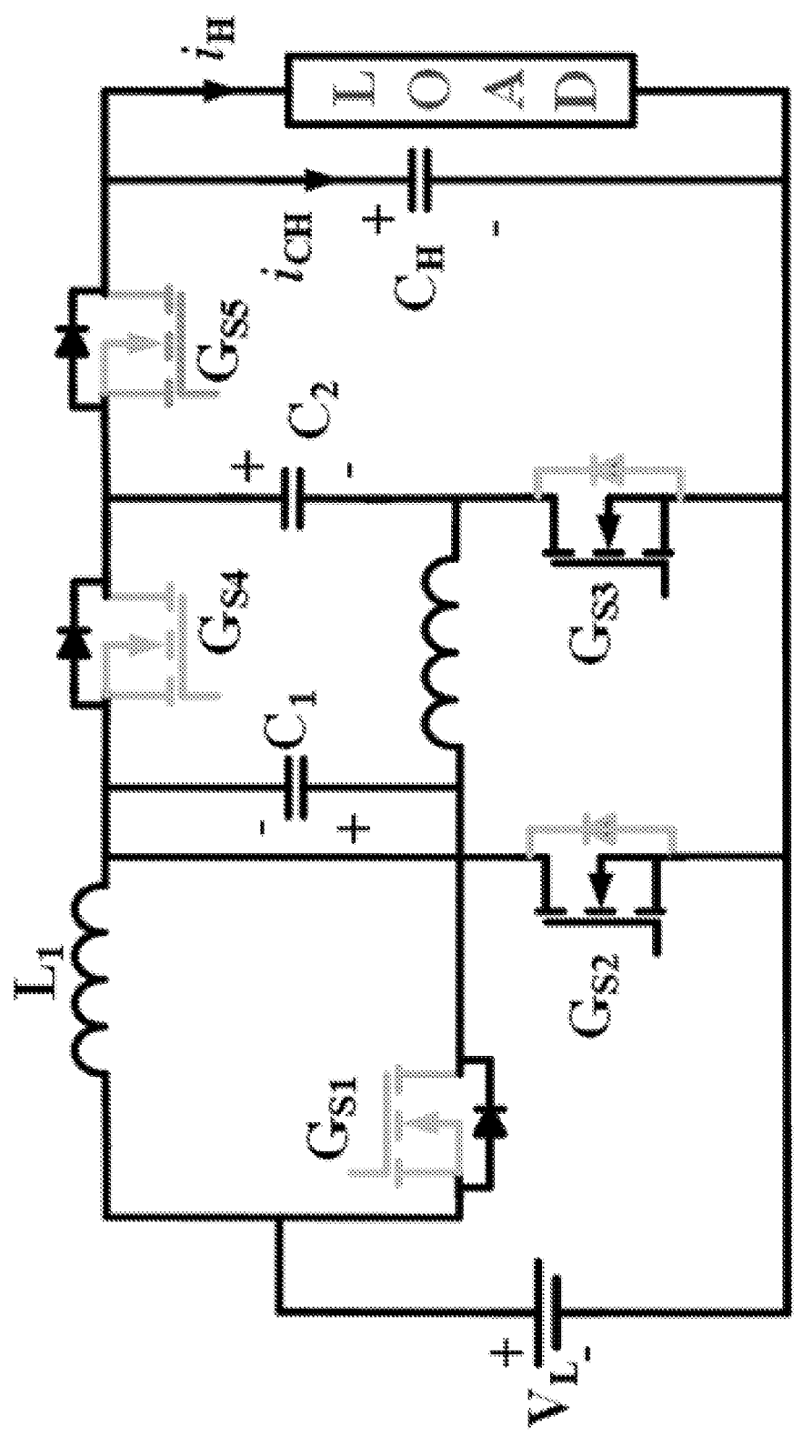
FIG. 6 is a circuit diagram of a bidirectional DC-DC converter in a boost operational mode.

FIG. 6 is a circuit diagram 600 of a bidirectional DC-DC converter 102 in a boost operational mode. In the boost operational mode, the first set of switches (e.g., $G_{S1}$, $G_{S4}$, and $G_{S5}$) may be turned off, and the second set of switches (e.g., $G_{S2}$ and $G_{S3}$) may be turned on. The boost operational mode may be operated in various PWM types (e.g., type I, type II, and type III, as described above).

Figure 7:
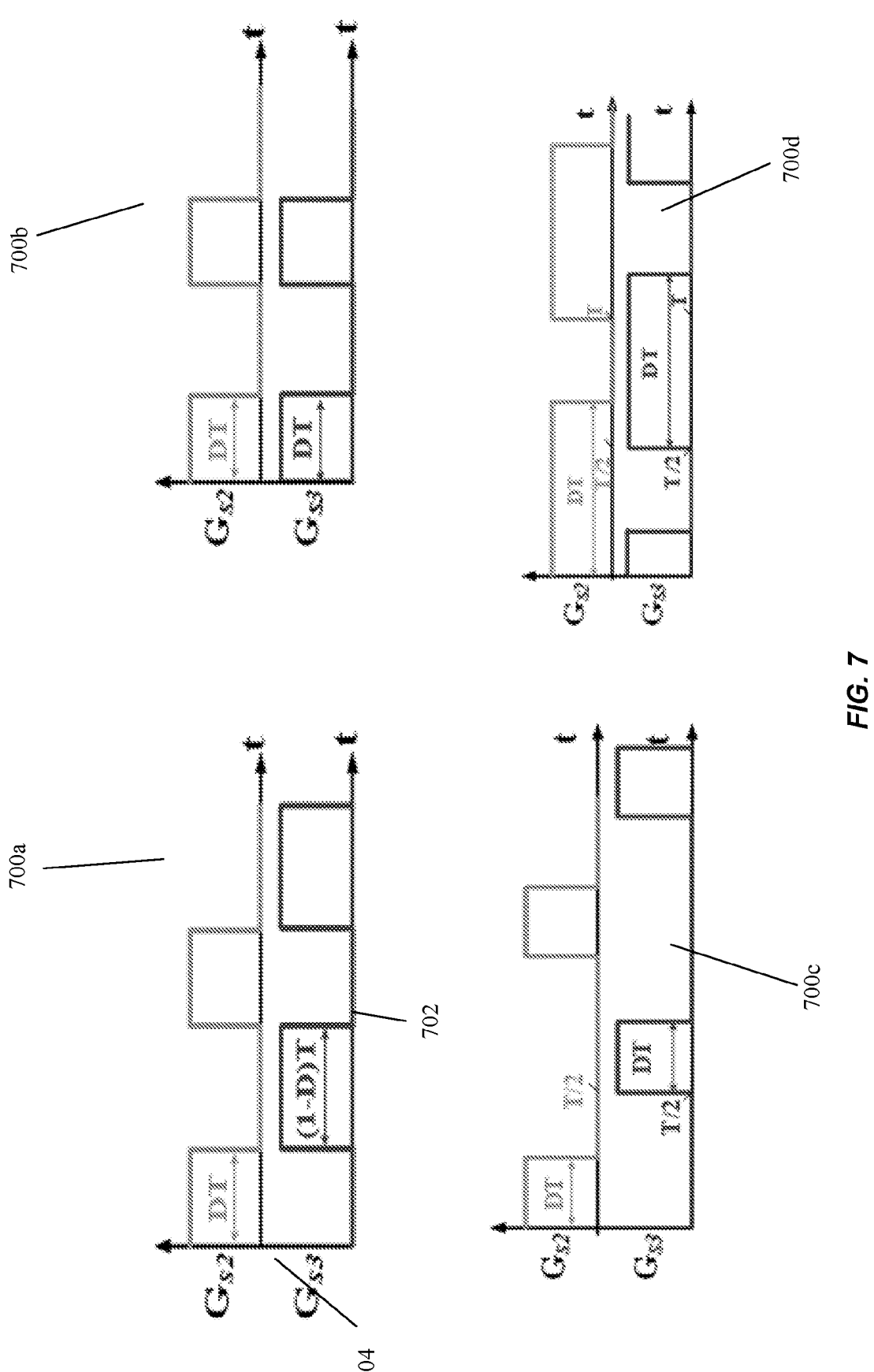
FIG. 7 is sets of various PWM types for a boost operational mode of a bidirectional DC-DC converter.

FIG. 7 is a set of plots 700a-d of various pulses in various PWM types for a boost operational mode of a bidirectional DC-DC converter. The plots 700a-d can include a horizontal axis 702 that represents time and a vertical axis 704 that represents a pulse of a corresponding switch. The plot 700a can represent a type I PWM boost operation, the plots 700b-c can represent a type II PWM boost operation, and the plot 700d can represent a type III PWM boost operation. The plot 700b can illustrate a type II PWM boost operation in which pulses are in phase, and the plot 700c can illustrate a type PWM boost operation in which the pulses are out of phase by 180°.

Figure 8:
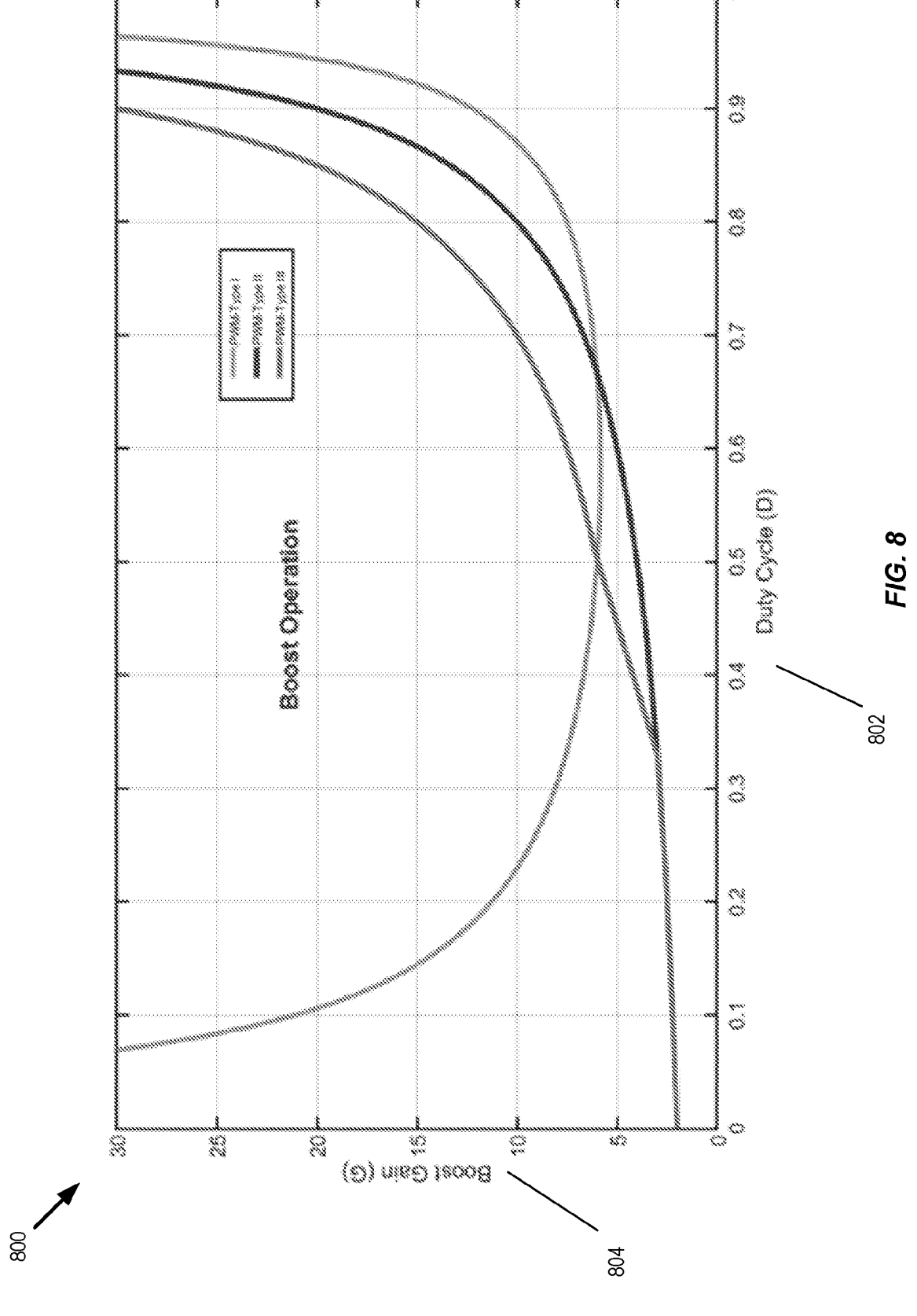
FIG. 8 is a plot of converter boost gain versus duty cycle for a boost operational mode of a bidirectional DC-DC converter.

FIG. 8 is a plot 800 of converter gain versus duty cycle for a boost operational mode of a bidirectional DC-DC converter 102. The plot 800 can include a horizontal axis 802 that can represent a duty cycle of the bidirectional DC-DC converter 102 and a vertical axis 804 that can represent boost gain of the bidirectional DC-DC converter 102. The result may depict that the converter boosting factor can be extend to 30 with type III PWM. The nature of the gain profile can be similar to the conventional boost converter, but the gain of this converter is thrice of the conventional boost.

During a buck operational mode, three switches (e.g., the first set of switches $G_{S1}$, $G_{S4}$, and $G_{S5}$) are controlled (e.g., turned on) using various PWM types. The second set of switches (e.g., the switches $G_{S2}$ and $G_{S3}$) is turned OFF permanently. Accordingly, the body diodes of the second set of switches are working for this mode of operation. The buck operational mode can be achieved by two different PWM types (or other suitable amounts of PWM types).

In a buck operational mode with PWM type I, the switch $G_{S1}$ and the switch $G_{S4}$ are synchronized and complementary to the gate pulse generated for $G_{S5}$. Accordingly, $G_{S5}$ is ON for DT, and $G_{S1}$ and $G_{S4}$ are ON for (1-D))T. In both intervals, energy can be transferred from a higher voltage end to a lower voltage end. PWM type I can exhibit a wide range of operational duty cycles and the maximum gain of the converter with this PWM can be 0.5. In a buck operational mode with PWM type II, the $G_{S1}$ pulse is synchronized with the pulse generated for $G_{S5}$ while the $G_{S4}$ pulse is complementary. Accordingly, if $G_{S5}$ is ON for DT, then $G_{S1}$ is also ON for DT, and $G_{S4}$ is ON for (1-D)T.

Figure 9:
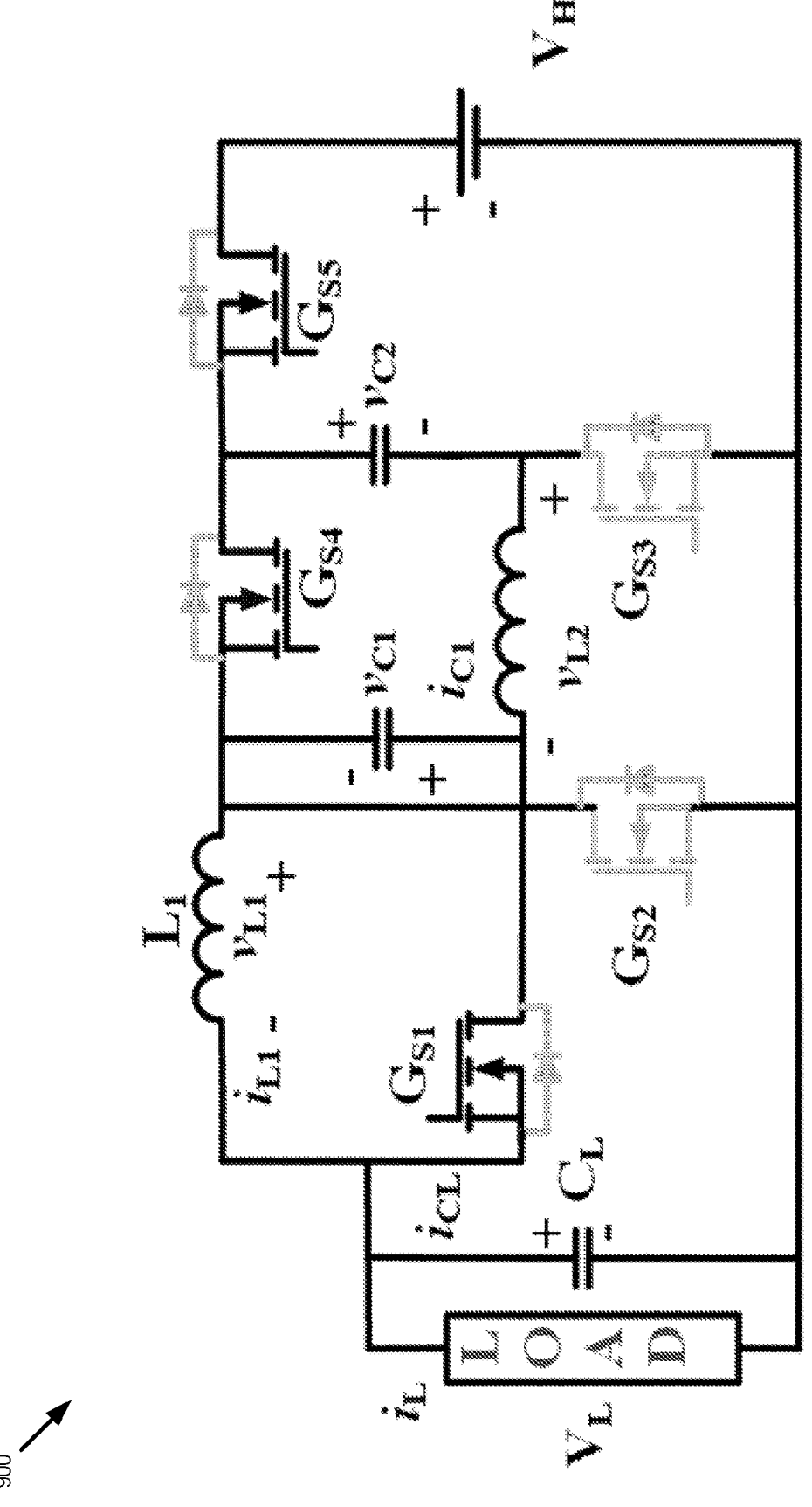
FIG. 9 is a circuit diagram of a bidirectional DC-DC converter in a buck operational mode.

FIG. 9 is a circuit diagram 900 of a bidirectional DC-DC converter 102 in a buck operational mode. In the buck operational mode, the first set of switches (e.g., $G_{S1}$, $G_{S4}$, and $G_{S5}$) may be turned on, and the second set of switches (e.g., $G_{S2}$ and $G_{S3}$) may be turned off. The buck operational mode may be operated in various PWM types (e.g., type I and type II as described above).

Figure 10:
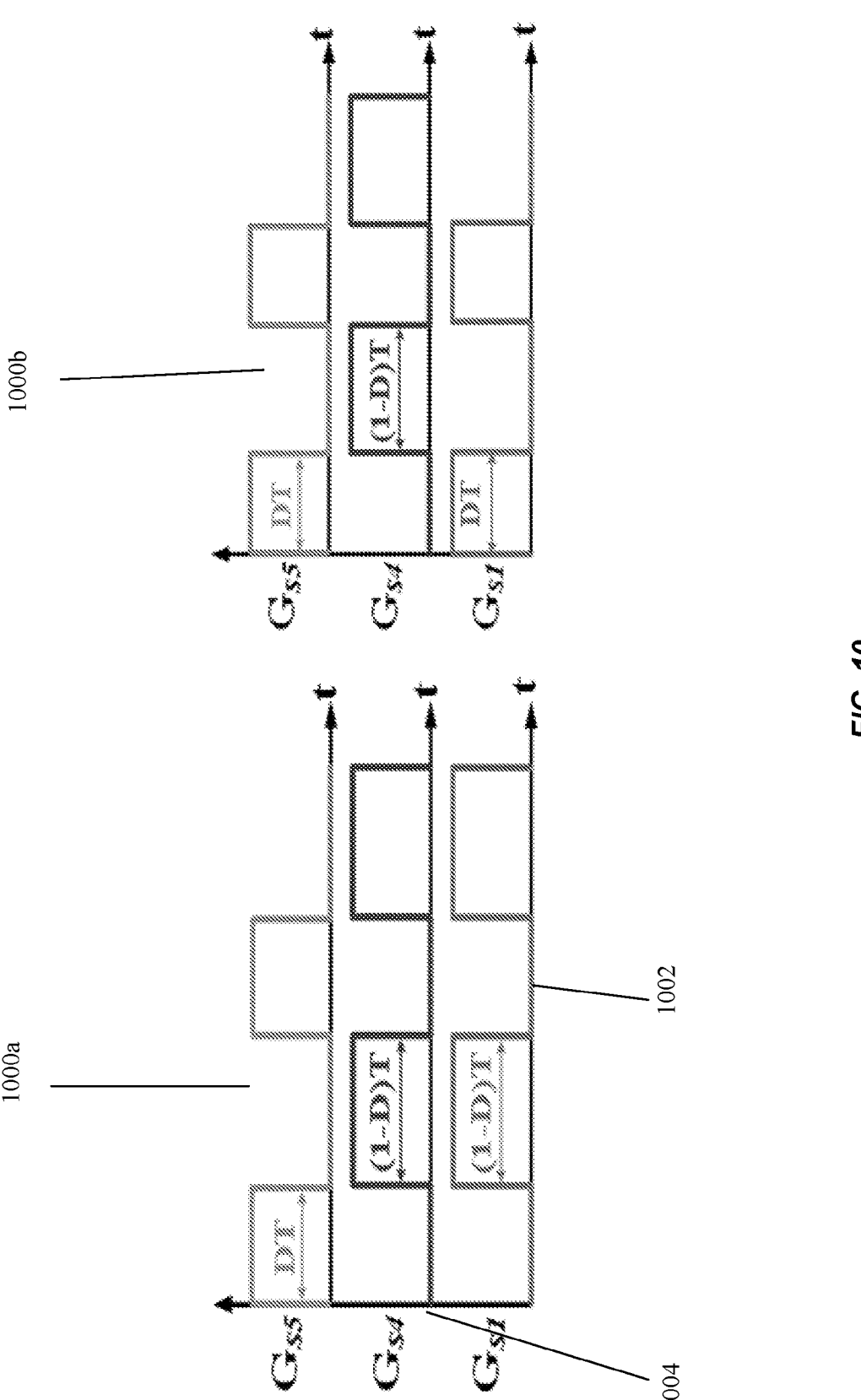
FIG. 10 is a set of plots of various pulses in various PWM types for a buck operational mode of a bidirectional DC-DC converter.

FIG. 10 is a set of plots 1000a-b of various pulses in various PWM types for a buck operational mode of a bidirectional DC-DC converter 102. The plots 1000a-b can include a horizontal axis 1002 that represents time and a vertical axis 1004 that represents a pulse of a corresponding switch. The plot 1000a can represent a type I PWM buck operation, and the plot 1000b can represent a type II PWM buck operation.

Figure 11:
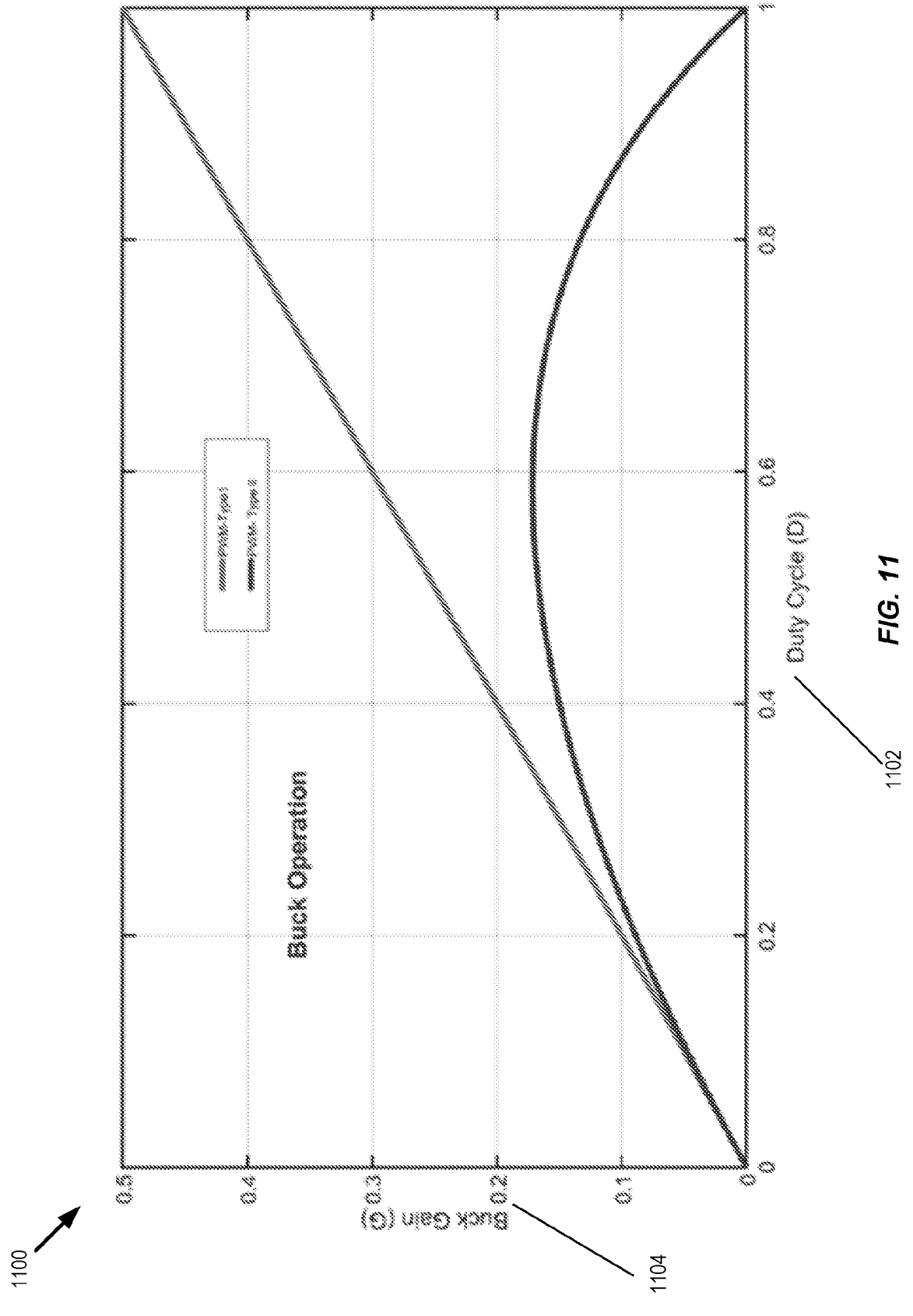
FIG. 11 is a plot of converter buck gain versus duty cycle for a buck operational mode of a bidirectional DC-DC converter.

FIG. 11 is a plot 1100 of converter buck gain versus duty cycle for a buck operational mode of a bidirectional DC-DC converter 102. The plot 1100 can include a horizontal axis 1102 that can represent a duty cycle of the bidirectional DC-DC converter 102 and a vertical axis 1104 that can represent a buck gain of the bidirectional DC-DC converter 102. The plot 1100 may illustrate that PWM type I is linear and PWM type II is non-linear (e.g., parabolic or other suitable non-linear trends).

Figure 12:
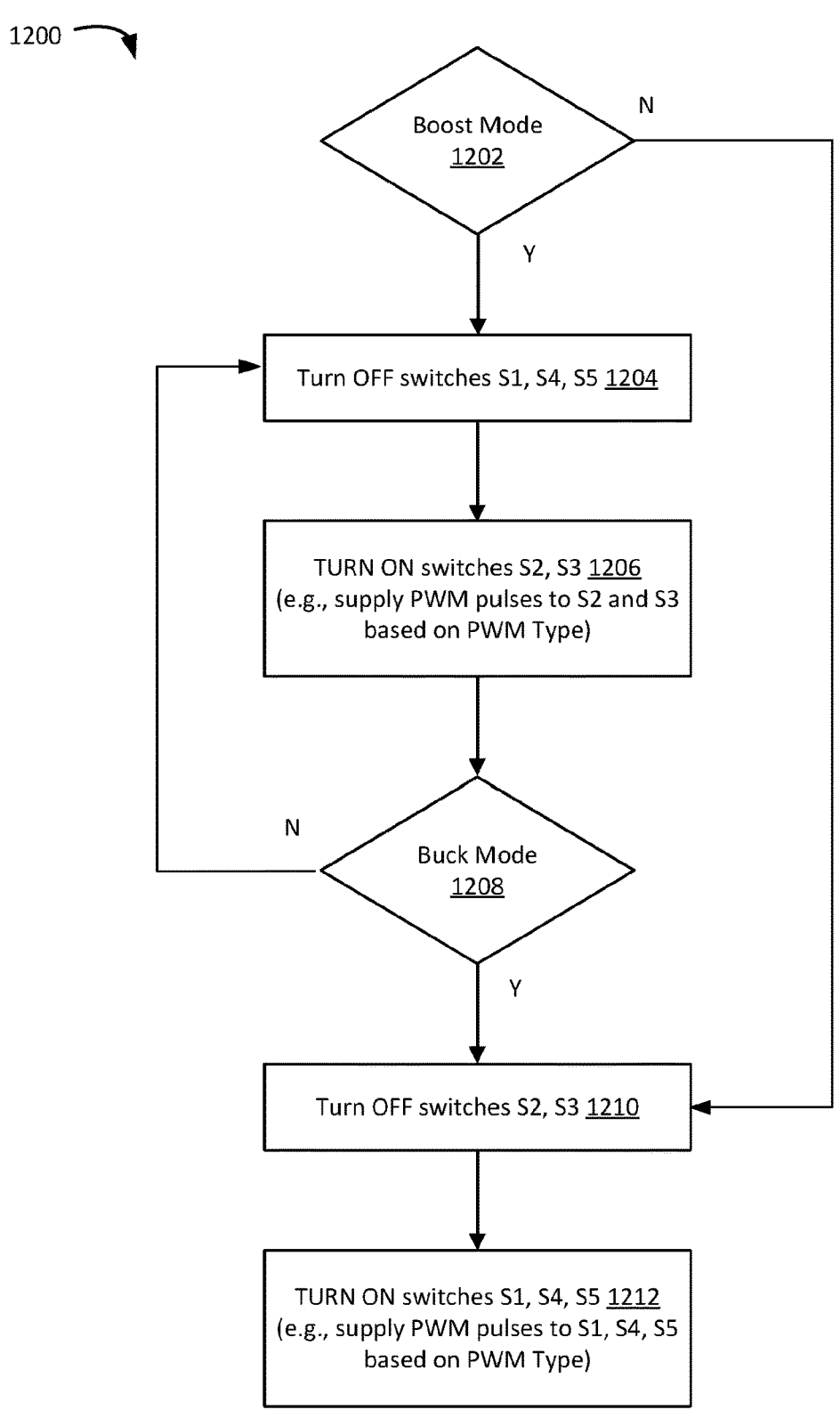
FIG. 12 is a flowchart of a process to turn on switches and turn off switches in various operational modes of the bidirectional DC-DC converter.

FIG. 12 is a flowchart of a process 1200 to turn ON switches and turn OFF switches in various operational modes of the bidirectional DC-DC converter 102. At operation 1202, a boost operational mode can be selected for the bidirectional DC-DC converter 102. For example, a system of an EV 100 (or an HEV) can transmit a signal to the bidirectional DC-DC converter 102 (or to a control unit thereof) to select the boost operational mode based on an operation of the EV 100. If the boost mode is selected, operation 1204 follows operation 1202. Otherwise, the DC-DC converter 102 can be operated in a buck mode and operation 1210 may follow operation 1202. At operation 1204, a first set of switches (e.g., the switches $G_{S1}$, $G_{S4}$, and $G_{S5}$) can be turned OFF. By turning the first set of switches OFF, no power may be supplied to the transistor. At operation 1206, a second set of switches (e.g., the switches $G_{S2}$ and $G_{S3}$) can be turned ON. By turning on the second set of switches, power may be supplied to the transistors thereof. Voltage can be supplied using PWM pulses via one of the PWM type operations (e.g., types I, II, and III) described above with respect to FIGS. 6-8. Although operations 1204 and 1206 are shown in a sequential manner, these operations can be performed in parallel or in the reverse order.

At operation 1208, a buck operational mode can be selected for the bidirectional DC-DC converter 102. For example, a system of the EV 100 (or an HEV) can transmit a signal to the bidirectional DC-DC converter 102 (or to the control unit thereof) to select the buck operational mode based on an operation of the EV 100. If the buck mode is selected, operation 1210 follows operation 1208. Otherwise, the DC-DC converter 102 can be operated in a boost mode and operation 1204 may follow operation 1208. At operation 1210, the second set of switches (e.g., the switches $G_{S2}$ and $G_{S3}$) can be turned OFF. By turning the second set of switches OFF, no power may be supplied to the transistor. At operation 1212, the first set of switches (e.g., the switches $G_{S1}$, $G_{S4}$, and $G_{S5}$) can be turned ON. By turning ON the first set of switches, power may be supplied to the transistors thereof. Voltage can be supplied using PWM pulses via one of the PWM type operations (e.g., types I and II) described above with respect to FIGS. 9-11. Although operations 1210 and 1212 are shown in a sequential manner, these operations can be performed in parallel or in the reverse order.

The above described converter can be operated in a voltage range, such as a voltage range of 48V to 300 V. Referring back to the types I, II, and III PMW operations, Table 1 below summaries different parameters of the converter at 300V.

TABLE 1

| Parameters of the converter at 300 V | | | |
| --- | --- | --- | --- |
| Parameter | PWM Type I | PWM Type II | PWM Type III |
| Duty D | 0.45 | 0.68 | 0.52 |
| (Vc1, Vc2) | (48 V, 87 V) | (48 V, 0 V) | (48 V, 100 V) |
| (IL1, IL2) | (4.04 A, 2.22 A) | (3.125 A, 3.125 A) | (3.846 A, 1.923 A) |
| Voltage Stress | $V_{S1} = V_{S2} = 87$ V<br>$V_{S5} = 300$ V<br>$V_{S5} = V_{S3} = 213$ V | $V_{S1} = V_{S2} = V_{S4} = 150$ V<br>$V_{S4} = V_{S5} = 300$ V | $V_{S1} = V_{S2} = V_{S5} = 100$ V<br>$V_{S3} = 200$ V<br>$V_{S4} = 300$ V |
| Current Stress | $I_{S1} = 4.9$ A<br>$I_{S2} = 6.7565$ A,<br>$I_{S3} = 4.04$ A,<br>$I_{S4} = 1.818$ A<br>$I_{S5} = 2.222$ A | $I_{S1} = I_{S2} = = I_{S5} = 3.125$ A,<br>$I_{S3} = 4.59$ A,<br>$I_{S4} = 1.47$ A | $I_{S1} = I_{S3} = = 3.846$ A,<br>$I_{S2} = 6.25$ A,<br>$I_{S4} = I_{S5} = 1.923$ A |

As shown in Table 1, the voltage stress across both capacitors in all three PWM types s are low. Therefore, the described needs smaller capacitors in various applications such as DC power supplies, renewable energy sources, battery powered systems, and battery powered electric vehicles, electric vehicle chargers, uninterrupted power supplies regenerative drives and wireless chargers. The described converter is capable to operate with the three PWM types, and is not sensitive to overlapping of gate signals generated for S1 and S2. Further, a current control mode technique generally needs information of inductor current. The reference converter needs two current sensors as the currents IL1 and IL2 are duty cycle D dependents. However, current sharing in the inductors for the described converter with PWM type II and PMW type III are in 1:1 and 1:2 ratio for all duty cycles. So only one current sensor can be sufficient. This reduces the number of current sensors from 2 to 1.

Simulation results will be presented and described with respect to FIGS. 13-36. Table 2 includes circuit parameters for the simulations.

TABLE 2

| Circuit parameters for simulations. | | | |
| --- | --- | --- | --- |
| Parameter | Value | Parameter | Value |
| $V_L$ | 30 V | $R_H$, $R_L$ | 160 Ω, 3.6 Ω |
| $V_H$ | 200 V | $L_1$, $r_{L1}$ | 250 µH, 27 mΩ |
| P | 250 W | $L_2$, $r_{L2}$ | 250 µH, 50 mΩ |
| $f_{sw}$ | 100 kHz | $C_1$, $r_{C1}$ | 47 µF, 20 mΩ |
| $C_L$ | 220 µF | $C_2$, $r_{C2}$ | 47 µF, 20 mΩ |
| $r_{CL}$ | 20 mΩ | $C_H$, $r_{CH}$ | 47 µF, 20 mΩ |

As depicted in FIG. 7, in the PWM type 1 boost operational mode, switches $G_{S2}$ and $G_{S3}$ are complementary (i.e., $G_{S2}$ is ON and $G_{S3}$ is OFF for DT duration, and $G_{S3}$ is ON and $G_{S2}$ is OFF for the next (1-D)T duration), and switches $G_{S1}$, $G_{S4}$ and $G_{S5}$ are always OFF. With this PWM type, the bidirectional DC-DC converter 102 operates in two modes. Mode 1 can be within the $0 \le t < DT$ interval, when $G_{S2}$ is ON and $G_{S3}$ is OFF, and mode 2 can be within the $DT \le t \le T$ interval, when $G_{S3}$ is ON and $G_{S2}$ is OFF.

Figure 13:
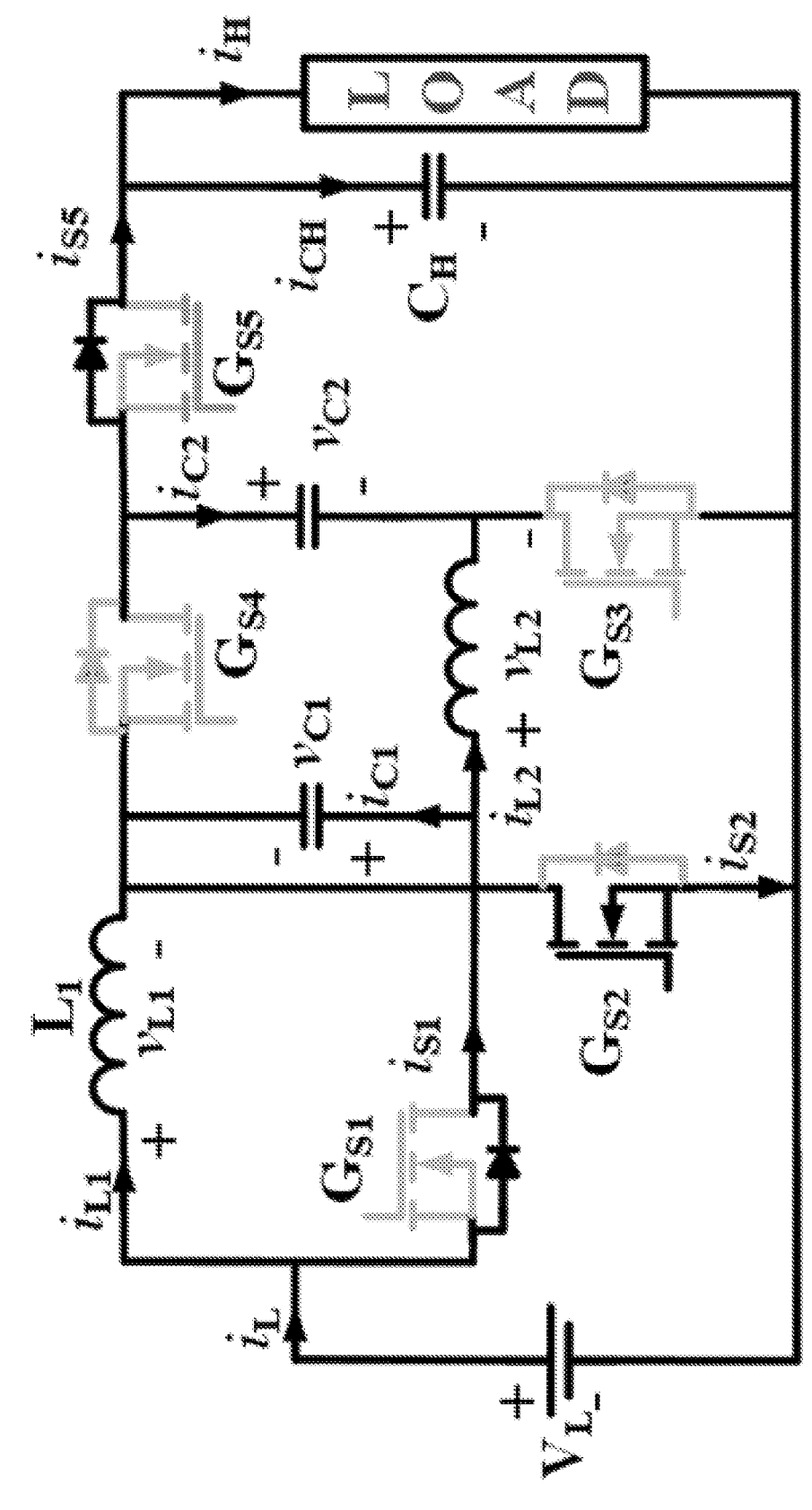
FIG. 13 is a circuit diagram of a bidirectional DC-DC converter operating in a first mode of type I PWM operation in a boost operational mode.

FIG. 13 is a circuit diagram 1300 of a bidirectional DC-DC converter 102 operating in a first mode of a type of PWM operation in a boost operational mode. The first mode may correspond to mode 1 in which the interval is $0 \le t < DT$. During this interval, the switch $G_{S2}$ is gated while the switch $G_{S3}$ is turned OFF, which can cause conduction of the body diode of the switches $G_{S1}$ and $G_{S5}$. The inductor voltage and capacitor current equations include:

$$v_{L1} = v_L$$

$$v_{C1} = v_L$$

$$v_{L2} = v_L + v_{C2} - v_H$$

$$i_{CH} = i_{L2} - i_H$$

$$i_{C2} = -i_{L2} = -i_{S5}$$

$$i_{C1} = i_{S1} - i_{L2} = i_{S2} - i_{L1}$$

In which $V_{L1}$ is the voltage across the inductor $L_1$, $V_L$ is the voltage across a low side of the converter, $V_{C1}$ is the voltage across the capacitor $C_1$, $V_{L2}$ is the voltage across the inductor $L_2$, $V_{C2}$ is the voltage across the capacitor $C_2$, $V_H$ is the voltage across a high side of the converter, $i_{CH}$ is the current through the capacitor $C_H$, $i_{L2}$ is the current through the inductor $L_2$, $i_H$ is the current across the high side, $i_{C2}$ is the current across the capacitor $C_2$, $i_{S5}$ is the current across the switch $G_{S5}$, $i_{C1}$ is the current across the capacitor $C_1$, $i_{S1}$ is the current across the switch $G_{S1}$, $i_{S2}$ is the current across the switch $G_{S2}$, and it is the current across the inductor $L_1$.

Figure 14:
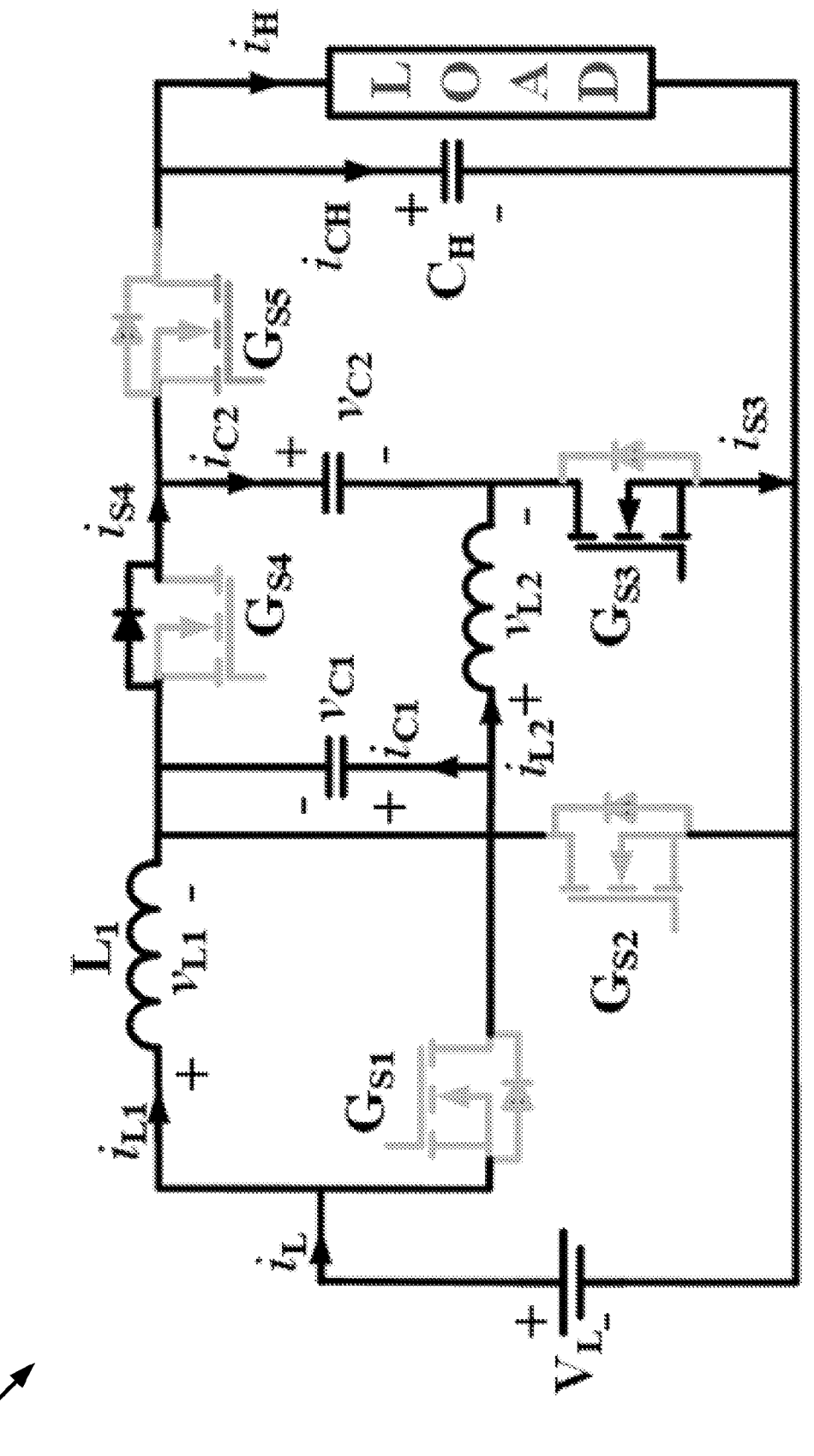
FIG. 14 is a circuit diagram of a bidirectional DC-DC converter operating in a second mode of type I PWM operation in a boost operational mode.

FIG. 14 is a circuit diagram 1400 of a bidirectional DC-DC converter 102 operating in a second mode of a type of PWM operation in a boost operational mode. The second mode may correspond to mode 2 in which the interval is DT≤t≤T. During the second mode of operation, the switch $G_{S3}$ and body diode of $G_{S4}$ conducts, while other devices are open. The following equations can be used to describe the circuit diagram 1400:

$$v_{L1} = v_L - v_{C2}$$
$$v_{L2} = v_{C1} + v_{C2}$$
$$i_{CH} = -i_H$$
$$i_{C2} = i_{S4} = i_{S3} - i_{L2} = i_{L1} - i_{L2}$$
$$i_{C1} = -i_{L2}$$

where $i_{S3}$ is the current across the switch $G_{S3}$ and $i_{S4}$ is the current across the switch $G_{S4}$.

In steady state, the capacitor average current and inductor average voltage over one switching interval can be zero. By applying a volt-seconds balance principle to the $L_1$ and $L_2$ over one switching interval, a voltage relation can follow:

$$V_{C1} = V_L, V_{C2} = \frac{V_L}{(1-D)}, \text{ and } V_H = \frac{(2-D)V_L}{D(1-D)}$$

By implementing a charge-seconds balance principle to the capacitors over one switching interval, a current relation can follow:

$$I_{L1} = \frac{I_H}{D(1-D)}, I_{L2} = \frac{I_H}{D}, \text{ and } I_H = \frac{D(1-D)I_L}{(2-D)}$$

The maximum voltage stress across each switch and maximum current through each switch can be:

$$V_{S1} = \frac{V_L}{(1-D)}$$
$$V_{S2} = \frac{V_L}{(1-D)}$$
$$V_{S3} = \frac{2V_L}{D}$$
$$V_{S4} = \frac{(2-D)V_L}{D(1-D)}$$
$$V_{S5} = \frac{2V_L}{D}$$
and,
$$I_{S1} = \frac{I_H}{D^2}$$
$$I_{S2} = \frac{(1-D+D^2)I_H}{D^2(1-D)}$$
$$I_{S3} = \frac{I_H}{D(1-D)}$$
$$I_{S4} = \frac{I_H}{(1-D)}$$
$$I_{S5} = \frac{I_H}{D}$$

Figure 15:
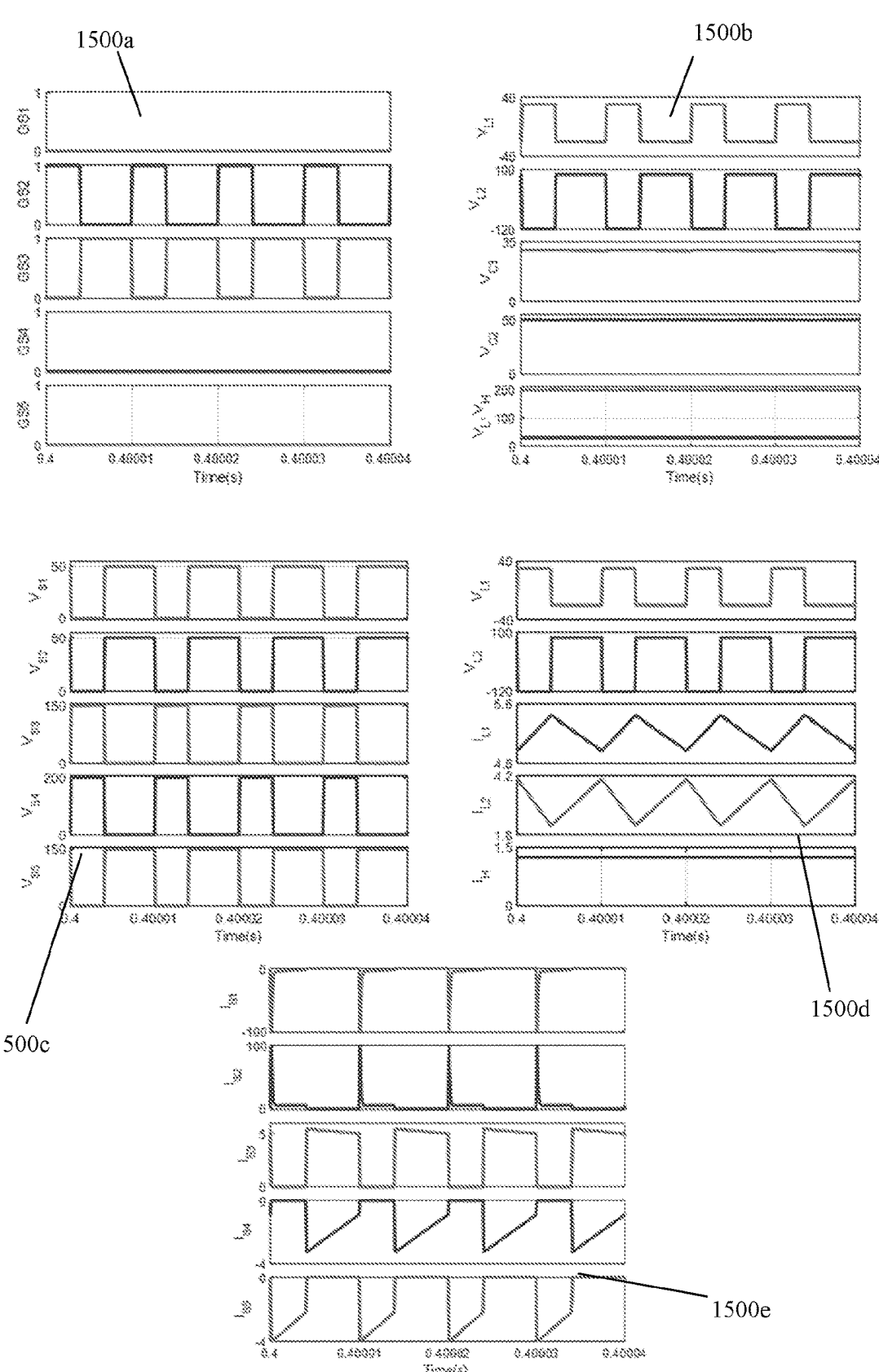
FIG. 15 is a set of plots of gate, voltage, and current waveforms for a PWM type I boost operational mode for a bidirectional DC-DC converter.

FIG. 15 is a set of plots 1500*a-e* of gate, voltage, and current waveforms for a PWM type I boost operational mode for a bidirectional DC-DC converter 102. Each plot can include a horizontal axis 1502 that can represent time and a vertical axis 1504 that can represent waveforms (e.g., for gating, voltage, current, etc.) for the components of the bidirectional DC-DC converter 102. The plot 1500*a* can be a plot of gate pulse of the switches versus time, the plots 1500*b-c* can be plots of voltage waveform of the inductors, capacitors, and switches versus time, and the plots 1500*d-e* can be plots of current waveform of the inductors, capacitors, and switches versus time.

In boost operational mode PWM type II, switches $G_{S2}$ and $G_{S3}$ are turned ON simultaneously (i.e., $G_{S2}$ and $G_{S3}$ are ON for DT duration, and they are turned OFF for the next (1-D)T duration). During the ON period, body diodes of the switches $G_{S1}$ and $G_{S4}$ conduct while body diode of $G_{S5}$ remains reversed biased.

Figure 16:
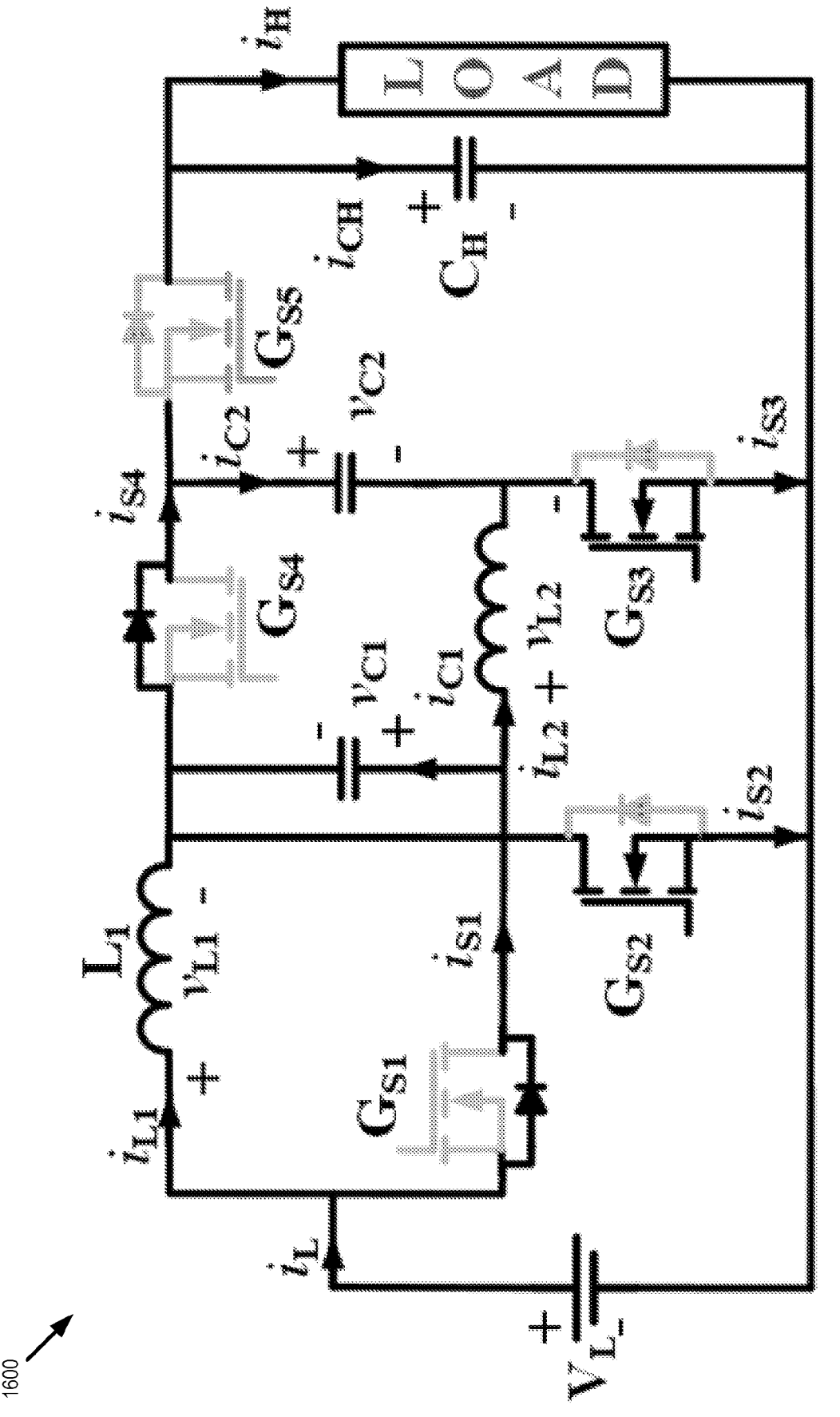
FIG. 16 is a circuit diagram of a bidirectional DC-DC converter operating in a first mode of type II PWM operation in a boost operational mode.

FIG. 16 is a circuit diagram of a bidirectional DC-DC converter operating in a first mode of a type of a type II PWM operation in a boost operational mode. The first mode may correspond to mode 1 in which the interval is 0≤t<DT. During this interval, the switches $G_{S2}$ and $G_{S3}$ are turned ON, which can cause conduction of body diode of switches $G_{S1}$ and $G_{S4}$. The inductor voltage and capacitor current equations can include:

$$v_{L1} = v_L$$
$$v_{L2} = v_{C1} = v_L$$
$$v_{C2} = 0$$
$$i_{CH} = -i_H$$
$$i_{C2} = i_{S4} = i_{S3} - i_{L2}$$
$$i_{C1} = i_{S1} - i_{L2}$$

Figure 17:
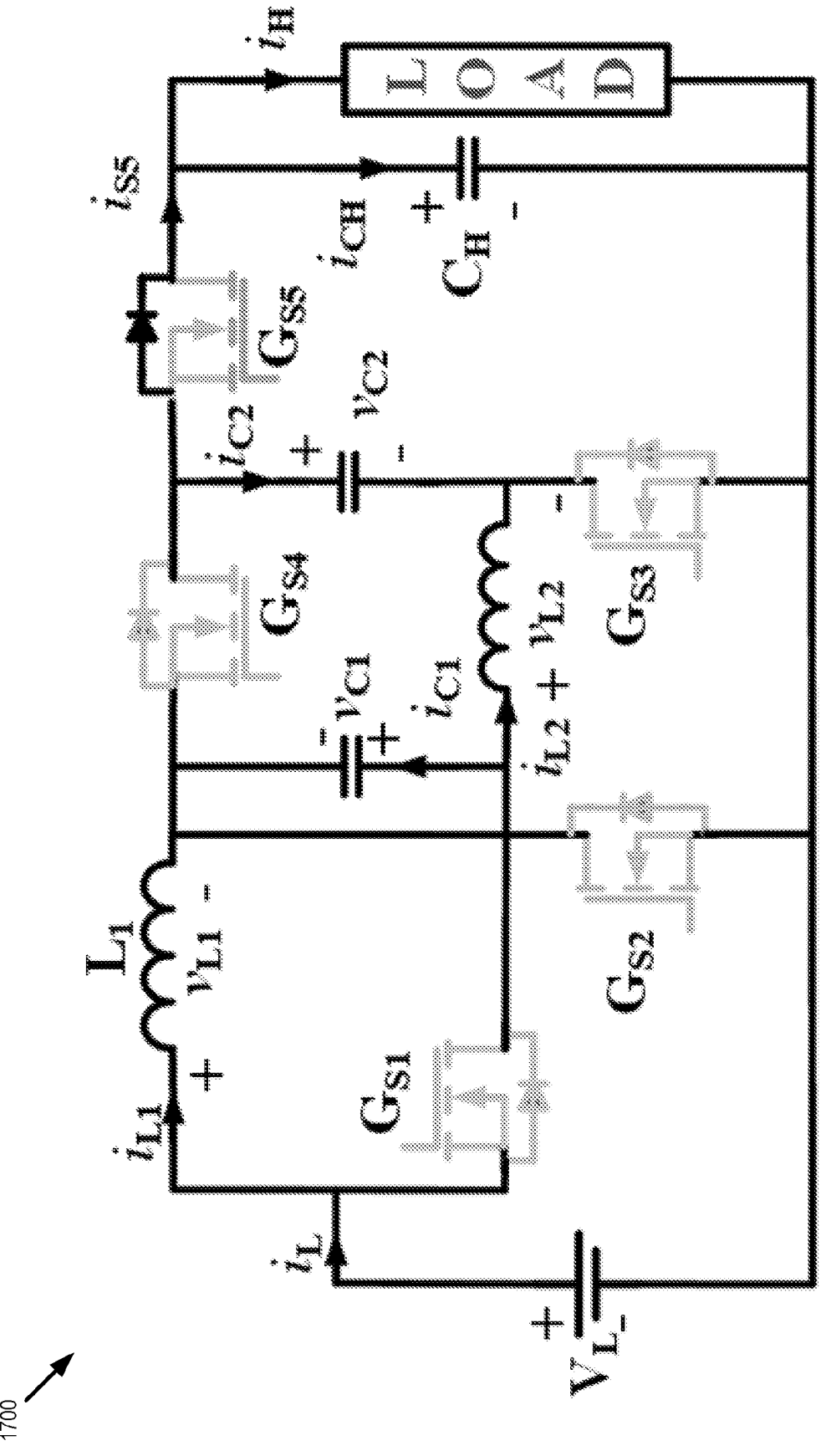
FIG. 17 is a circuit diagram of a bidirectional DC-DC converter operating in a second mode of a type of a type II PWM operation in a boost operational mode.

FIG. 17 is a circuit diagram of a bidirectional DC-DC converter operating in a second mode of a type of a type II PWM operation in a boost operational mode. The second mode may correspond to mode 2 in which the interval is DT≤t≤T. During this interval, the switches $G_{S2}$ and $G_{S3}$ are turned OFF. Accordingly, the body diodes of $G_{S1}$ and $G_{S4}$ are reverse biased, but the body diode of $G_{S5}$ can begin conduction. The following equations can result:

$$v_{L1} + v_{L2} = v_H - v_{C1} - v_{C2} - v_L$$
$$i_{CH} = i_{L2} - i_H$$
$$i_{C1} = i_{C2} = -i_{L2} = -i_{L1} = -i_{S5}$$

In steady state, the capacitor average current and inductor average voltage over one switching interval can be zero. By applying a volt-seconds balance principle to the inductors $L_1$ and $L_2$ over one switching interval, voltage relations can follow:

$$V_{C1} = V_L, V_{C2} = 0, \text{ and } V_H = \frac{2V_L}{(1-D)}$$

By implementing a charge-seconds balance principle to the capacitors over one switching interval, current relations can follow:

$$I_{L1} = \frac{I_H}{(1-D)}, I_{L2} = \frac{I_H}{(1-D)}, \text{ and } I_H = \frac{(1-D)I_L}{2}$$

The information of voltage stresses across the devices during OFF period and current through the devices during ON period can be used for rating the device performance. Accordingly, the maximum voltage stress across each switch and maximum current through switches can be represented by:

$$V_{S1} = \frac{V_L}{(1-D)}$$
$$V_{S2} = \frac{V_L}{(1-D)}$$
$$V_{S3} = \frac{2V_L}{(1-D)} \quad \text{and} \quad$$
$$V_{S4} = \frac{V_L}{(1-D)}$$
$$V_{S5} = \frac{2V_L}{(1-D)}$$

$$I_{S1} = \frac{I_H}{(1-D)}$$
$$I_{S2} = \frac{I_H}{(1-D)}$$
$$I_{S3} = \frac{I_H}{(1-D)}$$
$$I_{S4} = \frac{I_H}{D}$$
$$I_{S5} = \frac{I_H}{(1-D)}$$

Figure 18:
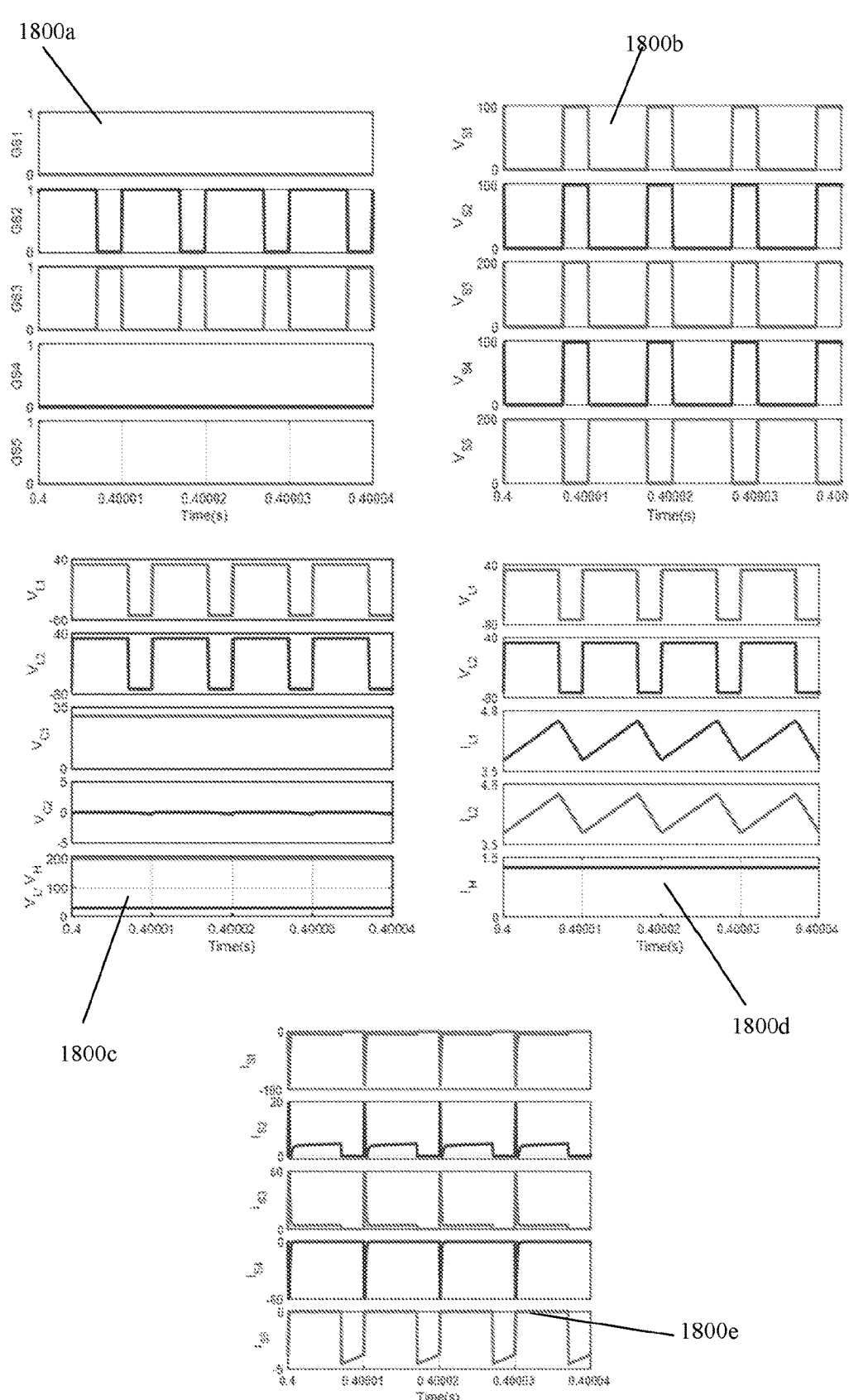
FIG. 18 is a set of plots of gate, voltage, and current waveforms for a PWM type II boost operational mode for a bidirectional DC-DC converter.

FIG. 18 is a set of plots of gate, voltage, and current waveforms for a PWM type II boost operational mode for a bidirectional DC-DC converter. Each plot can include a horizontal axis 1802 that can represent time and a vertical axis 1804 that can represent waveforms (e.g., for gating, voltage, current, etc.) for the components of the bidirectional DC-DC converter 102. The plot 1800a can be a plot of gate pulse of the switches versus time, the plots 1800b-c can be plots of voltage waveform of the inductors, capacitors, and switches versus time, and the plots 1800d-e can be plots of current waveform of the inductors, capacitors, and switches versus time.

In boost operational mode PWM type III, the switches $G_{S2}$ and $G_{S3}$ are switched at 180° phase difference, and the switches $G_{S1}$, $G_{S4}$, and $G_{S5}$ are turned OFF. From a converter gain prospective, PWM type III can be superior than previously discussed PWM types. With PWM type III, the bidirectional DC-DC converter 102 can behave differently in three different zones.

Figure 19:
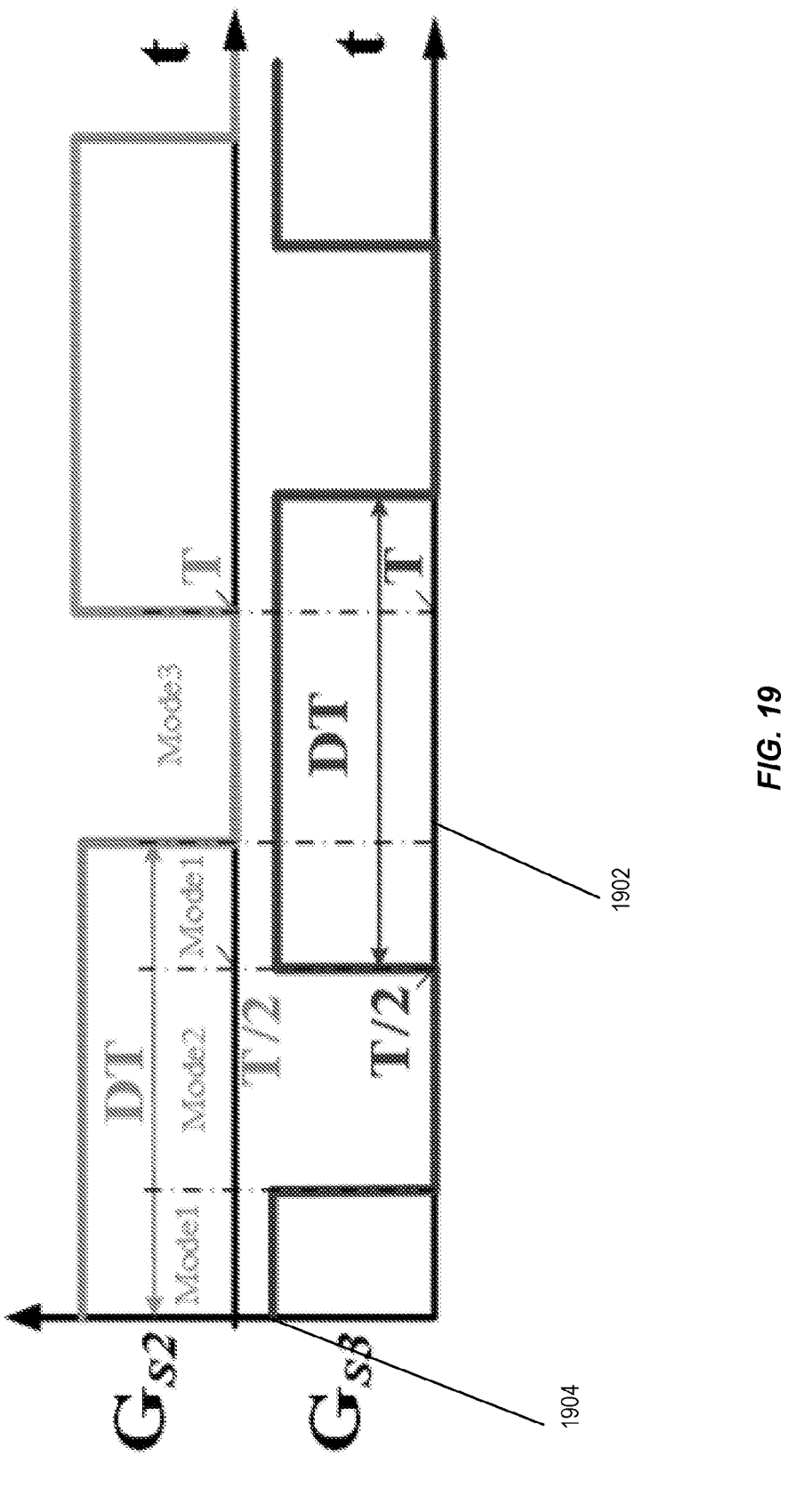
FIG. 19 is a plot of gate pulse versus time for a first zone of a type III PWM boost operational mode for a bidirectional DC-DC converter.

FIG. 19 is a plot 1900 of pulse versus time for a first zone of a type III PWM boost operational mode for a bidirectional DC-DC converter 102. The plot 1900 can include a horizontal axis 1902 that can represent time and a vertical axis 1904 that can represent pulses of various switches. In zone 1, the bidirectional DC-DC converter 102 can operate in three modes. Mode 1 can involve $G_{S2}$ and $G_{S3}$ being ON, mode 2 can involve $G_{S2}$ being ON and $G_{S3}$ being OFF and mode 3 can involve $G_{S2}$ being OFF and $G_{S3}$ being ON.

Figure 20:
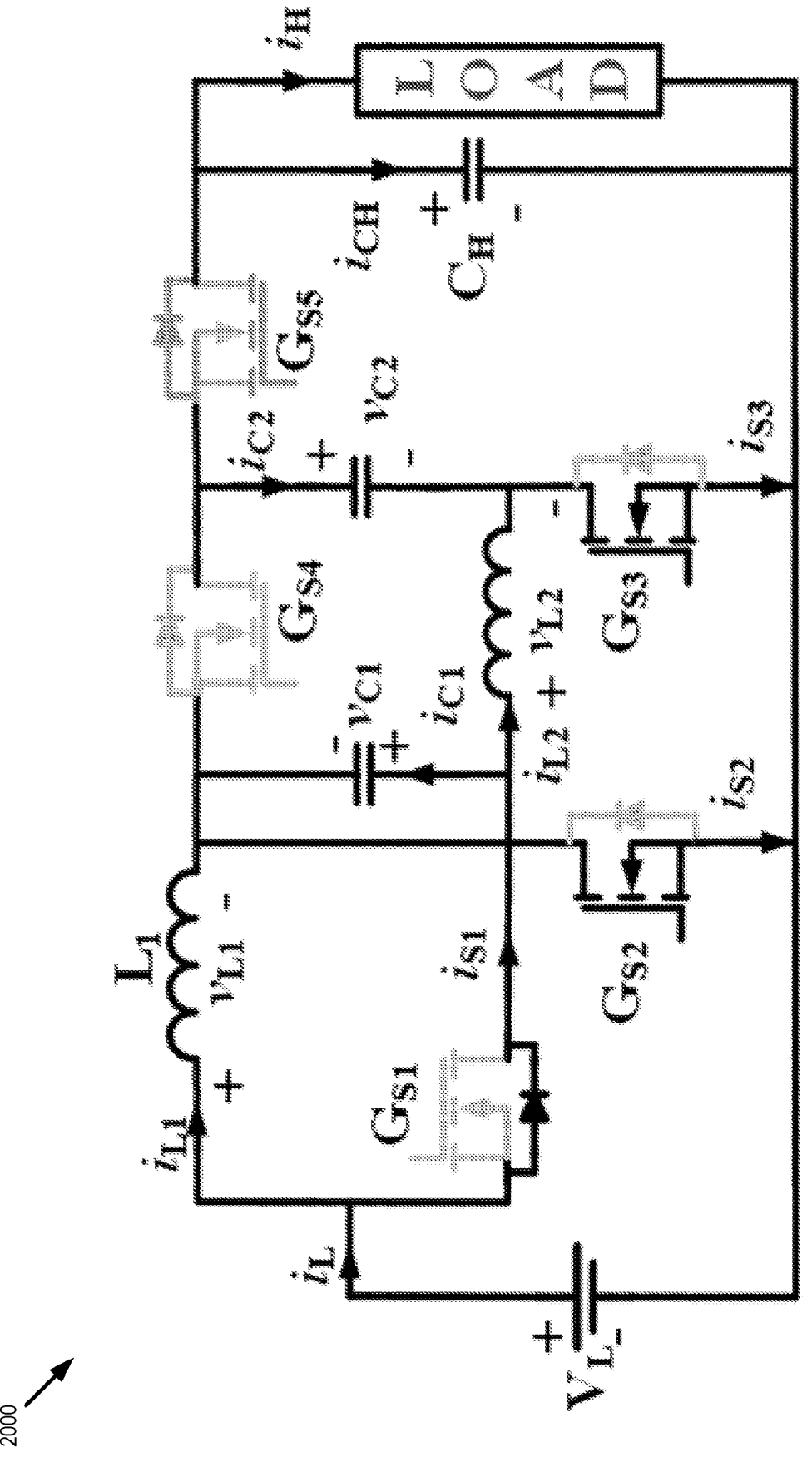
FIG. 20 is a circuit diagram of a bidirectional DC-DC converter operating in a first zone of a first mode of a type III PWM boost operation.

FIG. 20 is a circuit diagram 2000 of a bidirectional DC-DC converter 102 operating in a first zone of a first mode of a type III PWM boost operation. The first mode can be characterized by a time interval of 0≤t≤(D-0.5)T and 0.5 T≤t≤DT. In the first mode the switches $G_{S2}$ and $G_{S3}$ are ON, and accordingly, the body diode of $G_{S1}$ may conduct while body diodes of $G_{S4}$ and $G_{S5}$ remain reverse biased. The inductor voltage and capacitor current equations in the first mode can include:

$$v_{L1} = v_L$$
$$v_{L2} = v_L$$
$$v_{C1} = v_L$$
$$i_{CH} = -i_H$$
$$i_{C2} = 0$$

-continued
$$i_{C1} = i_{s1} - i_{L2} = i_{s2} - i_{L1}$$
$$i_{S3} = i_{L2}$$

Figure 21:
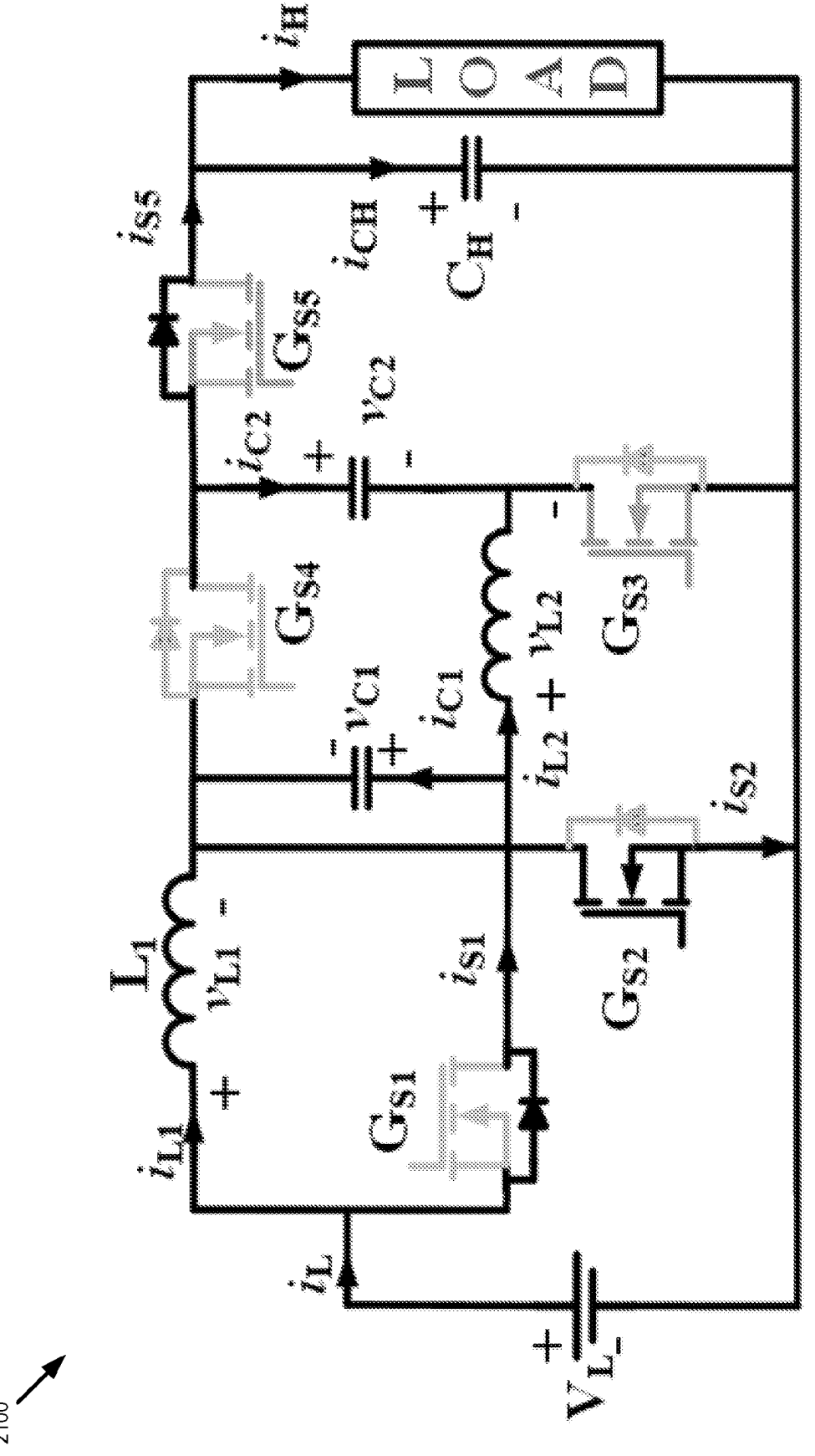
FIG. 21 is a circuit diagram of a bidirectional DC-DC converter operating in a first zone of a second mode of a type III PWM boost operation.

FIG. 21 is a circuit diagram 2100 of a bidirectional DC-DC converter 102 operating in a first zone of a second mode of a type III PWM boost operation. The second mode can be characterized by a time interval of (D-0.5)T≤t≤0.5 T. In the second mode, the switch $G_{S2}$ is ON and $G_{S3}$ is OFF. Accordingly, the body diodes of $G_{S1}$ and $G_{S5}$ begin to conduct while the body diode of $G_{S4}$ remains reverse biased. The inductor voltage and capacitor current equations in the second mode can include:

$$v_{L1} = v_L$$
$$v_{L2} = v_L + v_{C2} - v_H$$
$$v_{C1} = v_L$$
$$i_{CH} = i_{L2} - i_H$$
$$i_{C2} = -i_{L2}$$
$$i_{C1} = i_{s1} - i_{L2} = i_{s2} - i_{L1}$$
$$i_{S5} = i_{L2}$$

Figure 22:
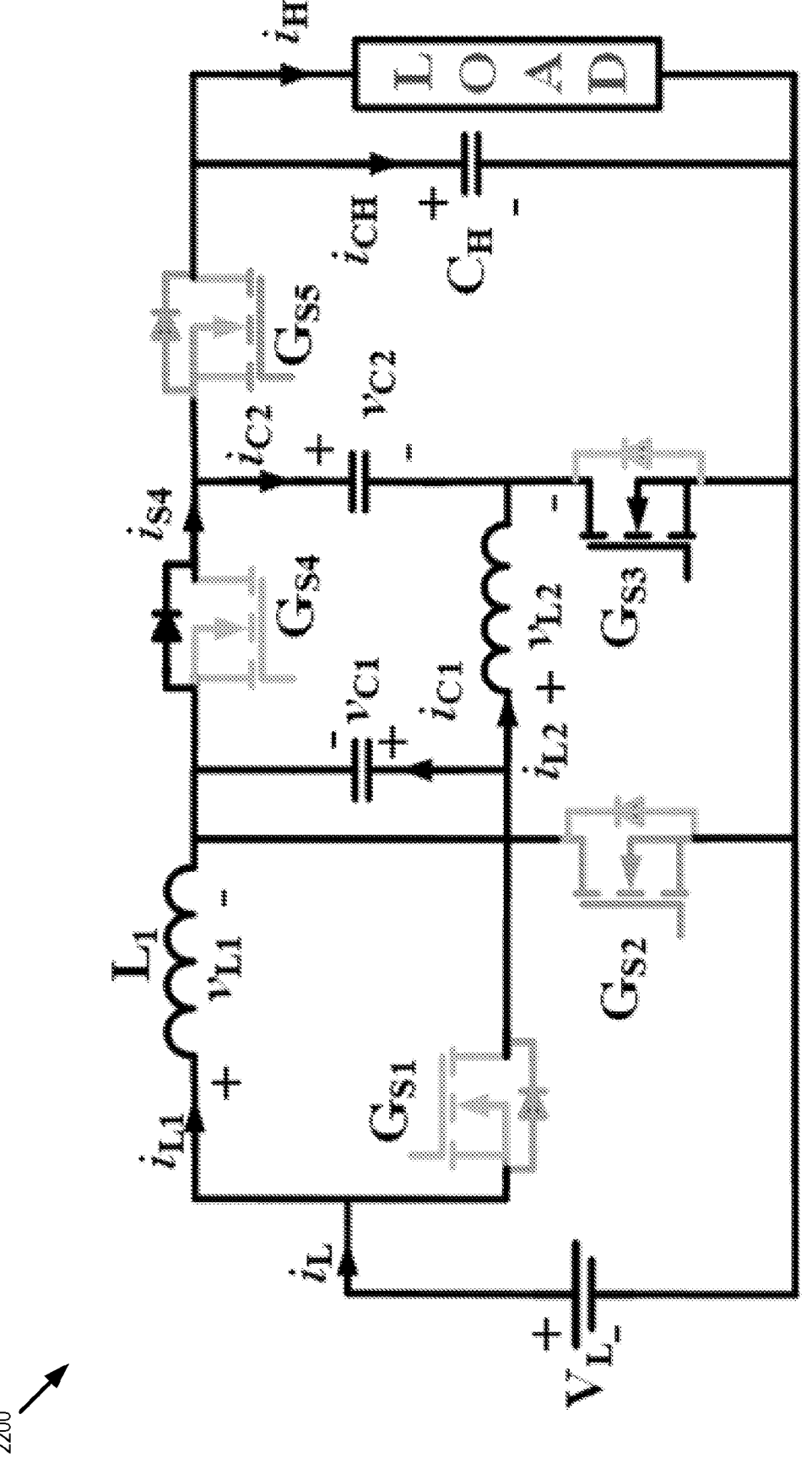
FIG. 22 is a circuit diagram of a bidirectional DC-DC converter operating in a first zone of a third mode of a type III PWM boost operation.

FIG. 22 is a circuit diagram 2200 of a bidirectional DC-DC converter 102 operating in a first zone of a third mode of a type III PWM boost operation. The third mode can be characterized by a time interval of DT≤t≤T. In the third mode, the switch $G_{S3}$ is ON and $G_{S2}$ is OFF. Accordingly, the body diodes of $G_{S1}$ and $G_{S5}$ are reversed biased, while the body diode of $G_{S4}$ begins to conduct. The inductor voltage and capacitor current equation in the third mode can include:

$$v_{L1} = v_L - v_{C2}$$
$$v_{L2} = v_{C1} + v_{C2}$$
$$i_{CH} = -i_H$$
$$i_{C2} = i_{L1} - i_{L2} = i_{s3} - i_{L2}$$
$$i_{C1} = -i_{L2} = i_{s4} - i_{L1}$$

Applying a volt-second balance across inductors $L_1$ and $L_2$, the voltage across capacitors $C_1$ and $C_2$, and converter gain can be represented by:

$$V_{C1} = V_L, \ V_{C2} = \frac{V_L}{(1-D)}, \ V_H = \frac{3V_L}{(1-D)}$$

The application of charge balance in capacitors gives:

$$I_{L1} = \frac{2I_H}{(1-D)}, \ I_{L2} = \frac{I_H}{(1-D)}, \text{ and } I_H = \frac{(1-D)I_L}{3}$$

The voltage and current stresses in the switches can be represented by:

$$V_{S1} = \frac{V_L}{(1-D)}$$

$$V_{S2} = \frac{V_L}{(1-D)}$$

$$V_{S3} = \frac{2V_L}{(1-D)} \quad \text{and,}$$

$$V_{S4} = \frac{3V_L}{(1-D)}$$

$$V_{S5} = \frac{V_L}{(1-D)}$$

$$I_{S1} = \frac{2I_H}{(1-D)}$$

$$I_{S2} = \frac{3I_H}{(1-D)}$$

$$I_{S3} = \frac{2I_H}{(1-D)}$$

$$I_{S4} = \frac{I_H}{(1-D)}$$

$$I_{S5} = \frac{I_H}{(1-D)}$$

Figure 23:
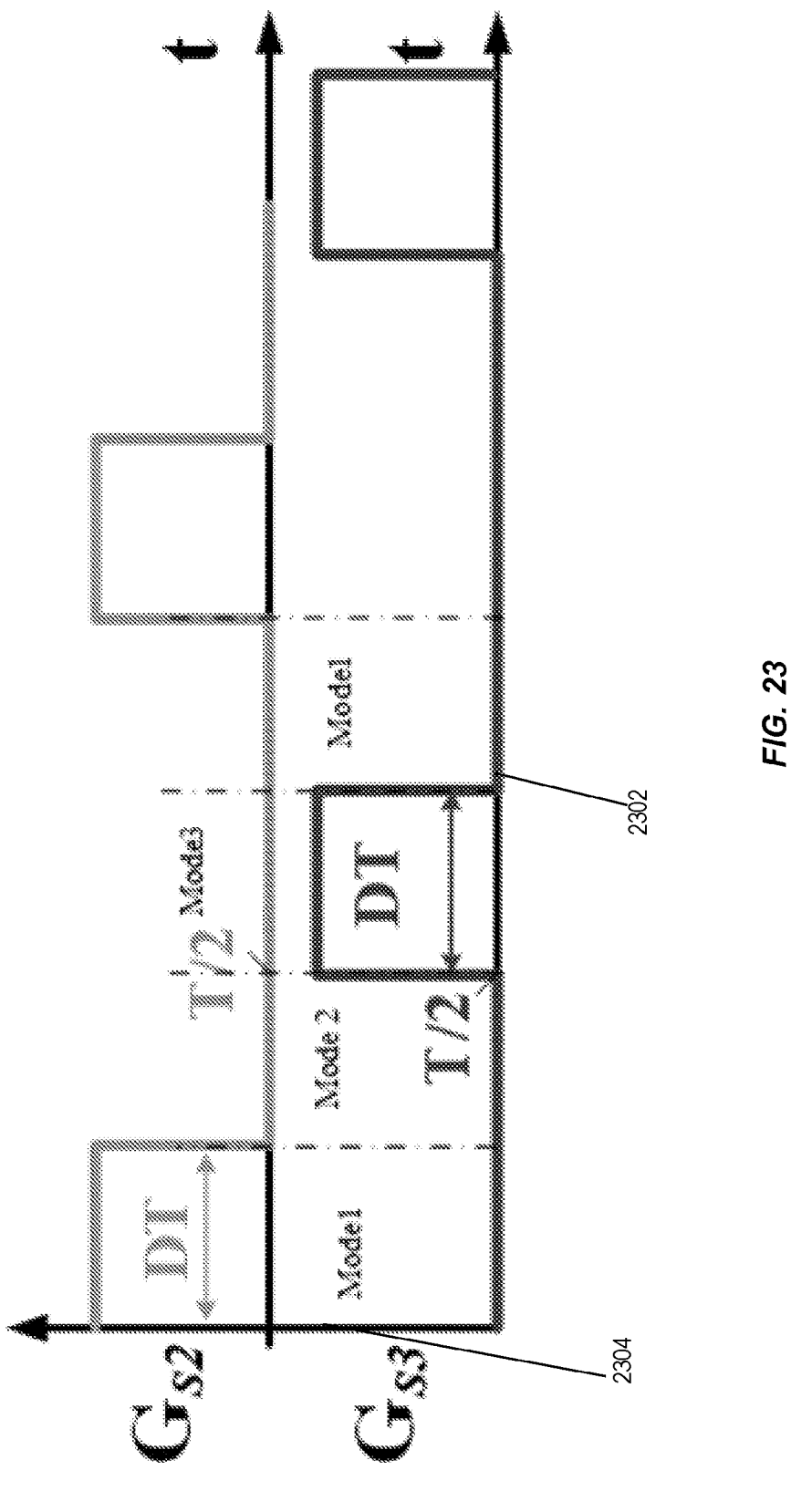
FIG. 23 is a plot of gate pulse versus time for a second zone of a type III PWM boost operational mode for a bidirectional DC-DC converter.

FIG. 23 is a plot 2300 of pulse versus time for a second zone of a type III PWM boost operational mode for a bidirectional DC-DC converter 102. The plot 2300 can include a horizontal axis 2302 that can represent time and a vertical axis 2304 that can represent pulses of various switches. In the second zone, the bidirectional DC-DC converter 102 can operate in three modes. Mode 1 can involve the switch $G_{S2}$ being ON and the switch $G_{S3}$ being OFF. Mode 2 can involve the switch $G_{S2}$ and the switch $G_{S5}$ both being OFF. Mode 3 can involve the switch $G_{S2}$ being OFF and the switch $G_{S3}$ being ON.

Figure 24:
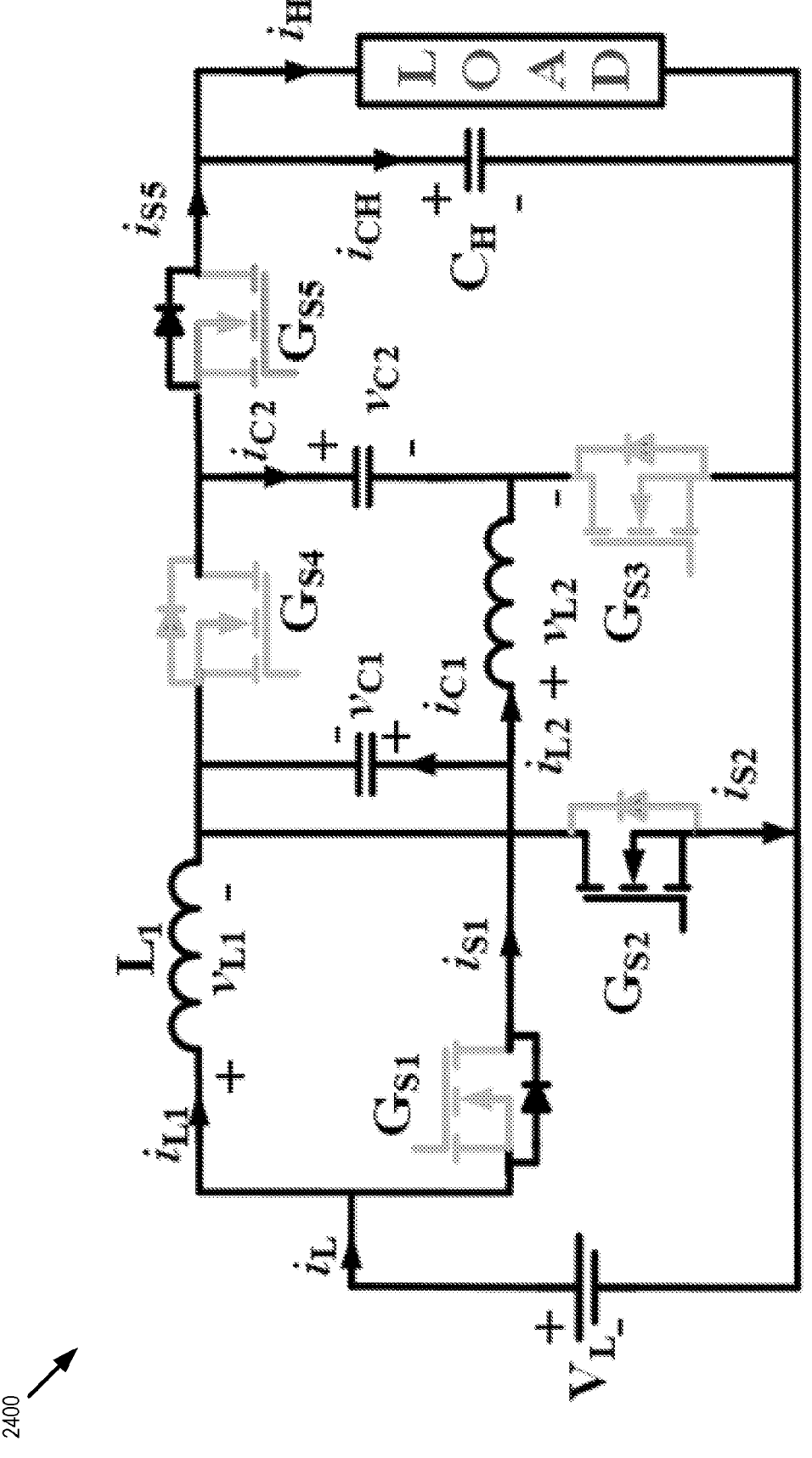
FIG. 24 is a circuit diagram of a bidirectional DC-DC converter operating in a second zone of a first mode of a type III PWM boost operation.

FIG. 24 is a circuit diagram 2400 of a bidirectional DC-DC converter 102 operating in a second zone of a first mode of a type III PWM boost operation. The first mode can be characterized by a time interval of 0≤t≤DT. In this mode the switches $G_{S1}$, $G_{S2}$, and $G_{S5}$ are ON, and the switches $G_{S3}$ and $G_{S4}$ are turned OFF. The inductor voltage and capacitor current equations in the first mode can include:

$$v_{L1} = v_L$$

$$v_{L2} = v_L + v_{C2} - v_H$$

$$v_{C1} = v_L$$

$$i_{CH} = i_{L2} - i_H$$

$$i_{C2} = -i_{L2}$$

$$i_{C1} = i_{S1} - i_{L2} = i_{S2} - i_{L1}$$

Figure 25:
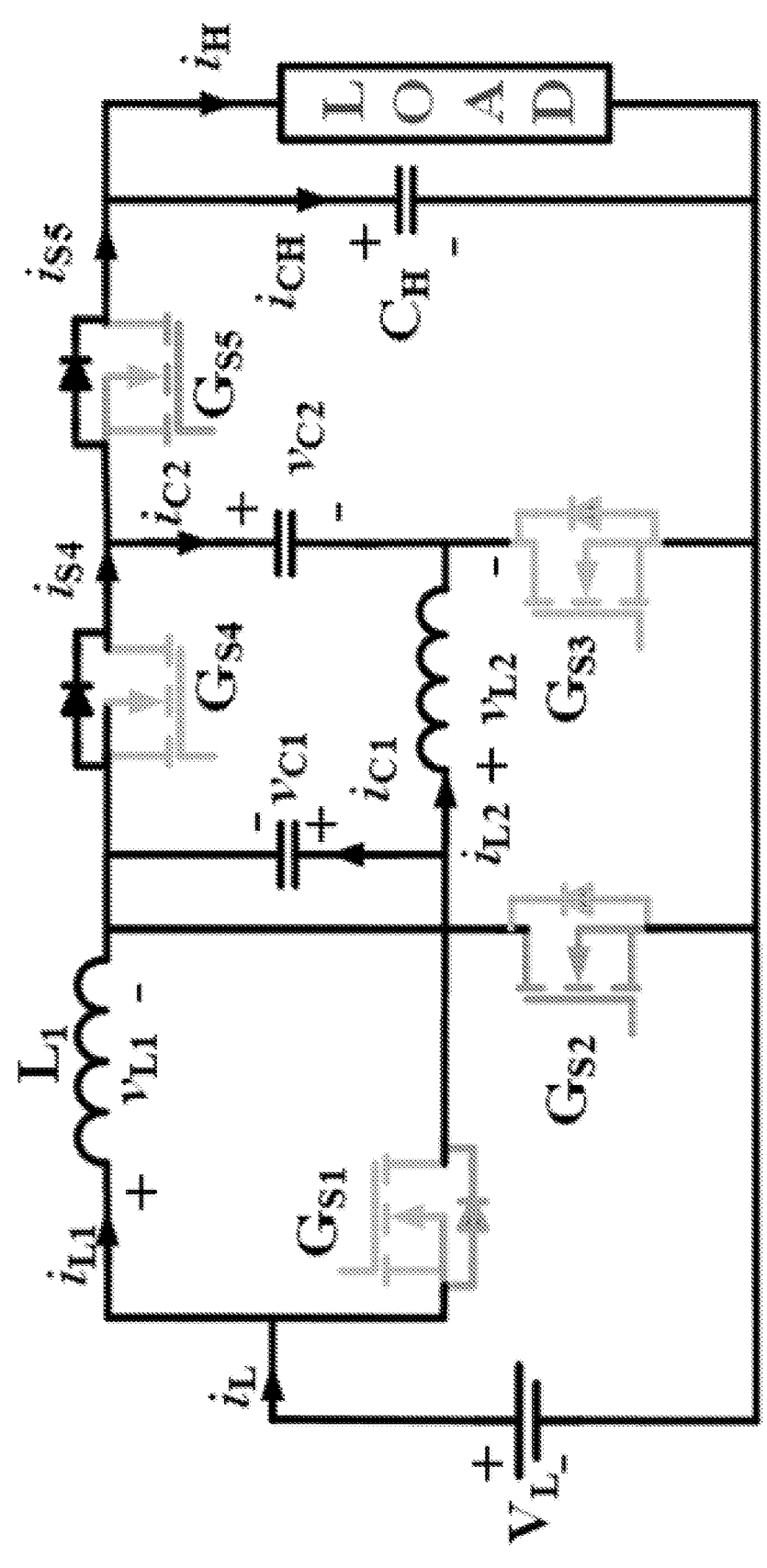
FIG. 25 is a circuit diagram of a bidirectional DC-DC converter operating in a second zone of a second mode of a type III PWM boost operation.

FIG. 25 is a circuit diagram 2500 of a bidirectional DC-DC converter 102 operating in a second zone of a second mode of a type III PWM boost operation. The second mode can be characterized by a time interval of T≤t≤0.5 T and (0.5+D)T≤t≤T. In the second mode, the switches $G_{S1}$, $G_{S2}$, and $G_{S3}$ are OFF, and the switches $G_{S4}$ and $G_{S5}$ are turned ON. The obtained inductor voltage and capacitor current equations in the second mode can include:

$$v_{L1} = v_L - v_H$$

$$v_{L2} = v_{C1} + v_{C2}$$

$$i_{CH} = i_{L1} - i_H$$

$$i_{C2} = -i_{L2}$$

$$i_{C1} = -i_{L2}$$

$$i_{S4} = i_{L1} - i_{L2}$$

$$i_{S5} = i_{L1}$$

Figure 26:
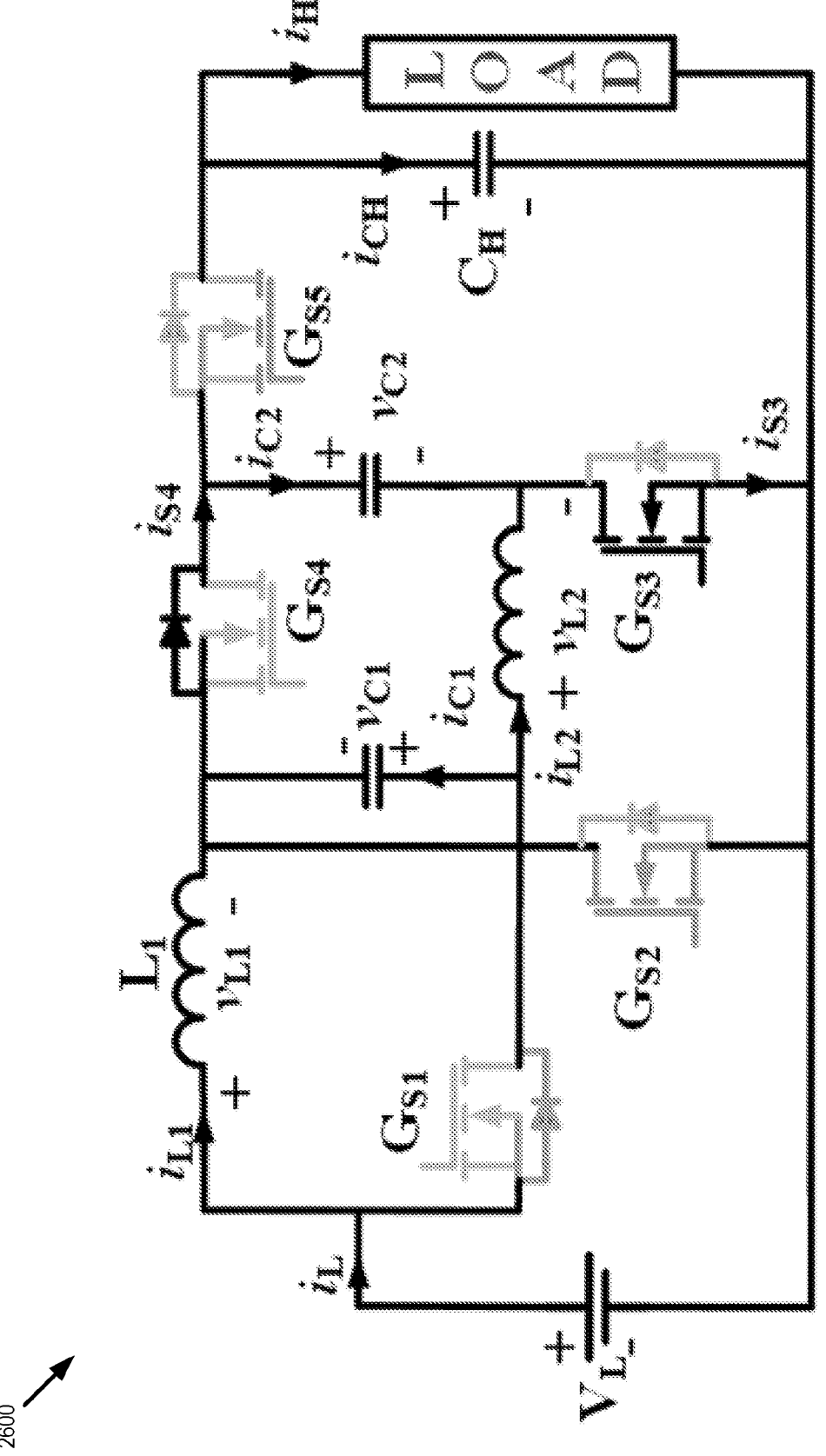
FIG. 26 is a circuit diagram of a bidirectional DC-DC converter operating in a second zone of a third mode of a type III PWM boost operation.

FIG. 26 is a circuit diagram 2600 of a bidirectional DC-DC converter 102 operating in a second zone of a third mode of a type III PWM boost operation. The third mode can be characterized by a time interval of 0.5 T≤t≤(0.5+D)T. In the third mode, $G_{S1}$, $G_{S2}$ and $G_{S5}$ are OFF, and the switches $G_{S3}$ and $G_{S4}$ are turned ON. The inductor voltage and capacitor current equations in the third mode can include:

$$v_{L1} = v_L - v_{C2}$$

$$v_{L2} = v_{C1} + v_{C2}$$

$$i_{CH} = -i_H$$

$$i_{C2} = i_{L1} - i_{L2}$$

$$i_{C1} = -i_{L2}$$

$$i_{S4} = i_{L1} - i_{L2}$$

$$i_{S3} = i_{L1}$$

Applying a volt-second balance across inductors $L_1$ and $L_2$, the voltage across capacitors $C_1$ and $C_2$ and the converter gain can be represented by:

$$V_{C1} = V_L, \quad V_{C2} = \frac{(3D-1)V_L}{D}, \quad V_H = \frac{(1+D)V_L}{(1-D)^2}$$

The application of charge balance in capacitors can give:

$$I_{L1} = \frac{I_H}{(1-D)^2}, \quad I_{L2} = \frac{DI_H}{(1-D)^2}, \quad \text{and } I_H = \frac{(1-D)^2 I_L}{(1+D)}$$

The maximum voltage stress across each switch and maximum current through switches can be represented by:

$$V_{S1} = \frac{(1+D)V_L}{(1-D)^2}$$

$$V_{S2} = \frac{(1+D)V_L}{(1-D)^2}$$

$$V_{S3} = V_h - V_{C2} \quad \text{and,}$$

$$V_{S4} = \frac{(1+D)V_L}{(1-D)^2}$$

$$V_{S3} = V_h - V_{C2}$$

$$I_{S1} = \frac{I_H}{(1-D)^2}$$

$$I_{S2} = \frac{(2-D)I_H}{(1-D)^2}$$

$$I_{S3} = \frac{I_H}{(1-D)^2}$$

$$I_{S4} = \frac{I_H}{(1-D)}$$

$$I_{S5} = \frac{I_H}{(1-D)^2}$$

Figure 27:
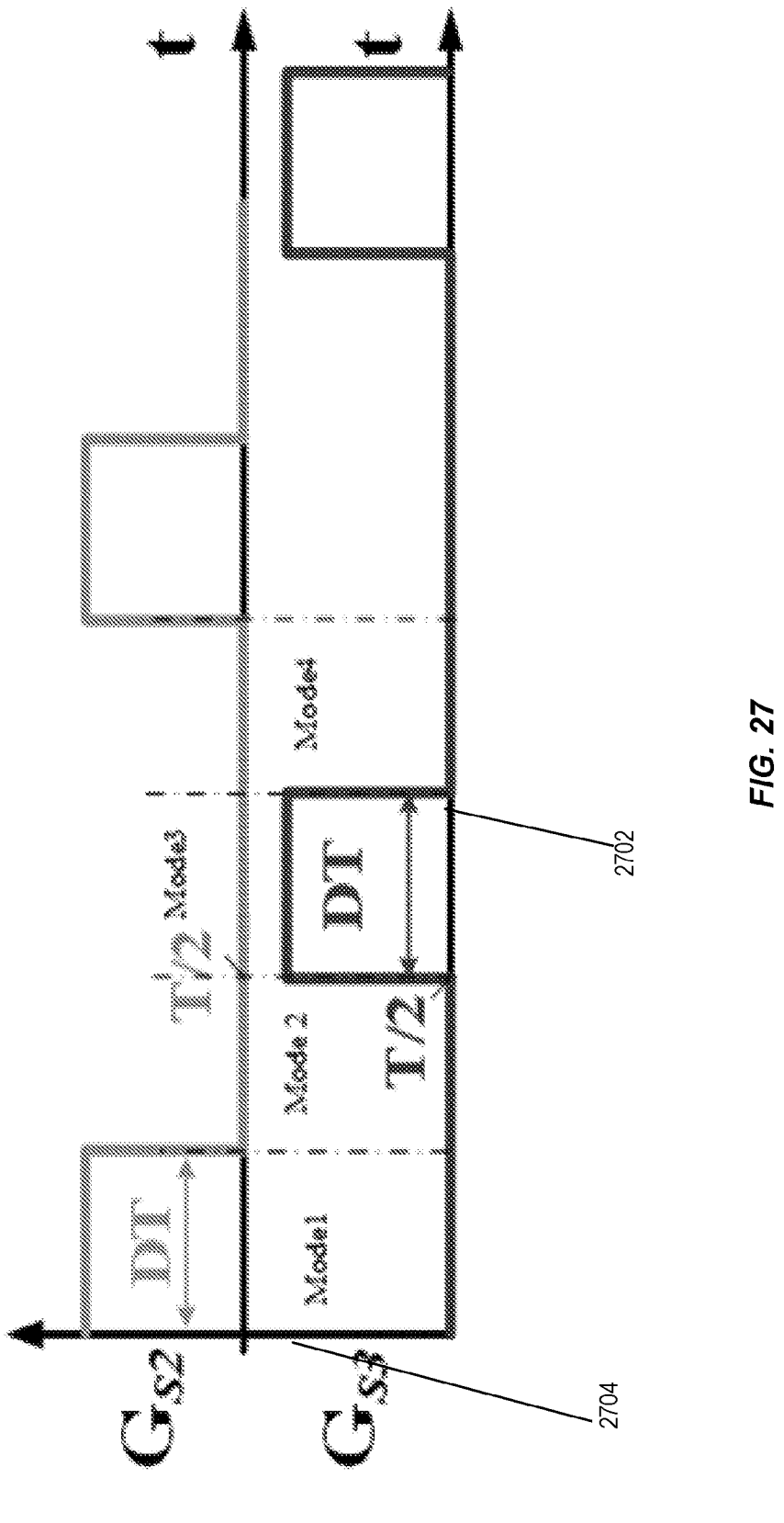
FIG. 27 is a plot of gate pulse versus time for a third zone of a type III PWM boost operational mode for a bidirectional DC-DC converter.

FIG. 27 is a plot 2700 of pulse versus time for a third zone of a type III PWM boost operational mode for a bidirectional DC-DC converter 102. The plot 2700 can include a horizontal axis 2702 that can represent time and a vertical axis 2704 that can represent pulses of various switches. In the third zone, the bidirectional DC-DC converter 102 can operate in four modes. Mode 1 and mode 2 can be similar or identical to mode 1 of the second zone and mode 2 of the second zone, respectively. Mode 3 and mode 4 are described below with respect to FIG. 28 and FIG. 29, respectively. The voltage $V_{C2}$ at D=0.33 can zero in the third zone. With zero $V_{C2}$, when $G_{S3}$ is turned ON, the body diodes of $G_{S1}$, and $G_{S2}$ begin to conduct. Additionally, after turning OFF $G_{S3}$, the switch $G_{S4}$ becomes open circuited.

Figure 28:
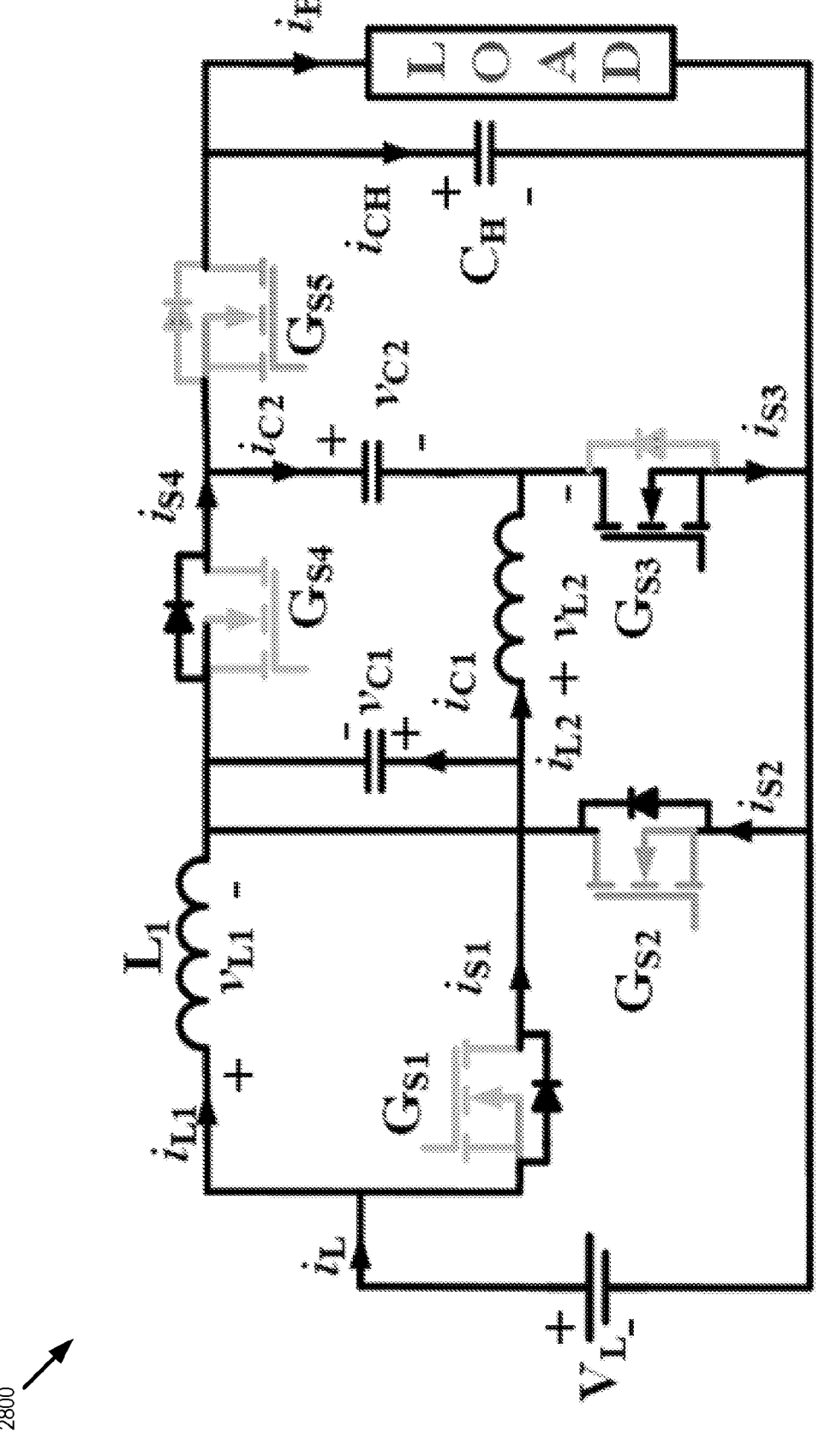
FIG. 28 is a circuit diagram of a bidirectional DC-DC converter operating in a third zone of a third mode of a type III PWM boost operation.

FIG. 28 is a circuit diagram 2800 of a bidirectional DC-DC converter 102 operating in a third zone of a third mode of a type III PWM boost operation. The third mode can be characterized by a time interval of 0.5 T≤t≤(0.5+D)T.

In the third mode of operation, the switches $G_{S1}$, $G_{S2}$, $G_{S3}$, and $G_{S4}$ conduct, while $G_{S5}$ is OFF. These equations can follow:

$$v_{L1} = v_L$$

$$v_{L2} = v_L$$

$$v_{C1} = v_L$$

$$v_{C1} = 0$$

$$i_{CH} = -i_H$$

$$i_{C2} = i_{S4} = i_{S3} - i_{L2}$$

$$i_{C1} = i_{S1} - i_{L2} = i_{L1} + i_{S2} - i_{S4}$$

Figure 29:
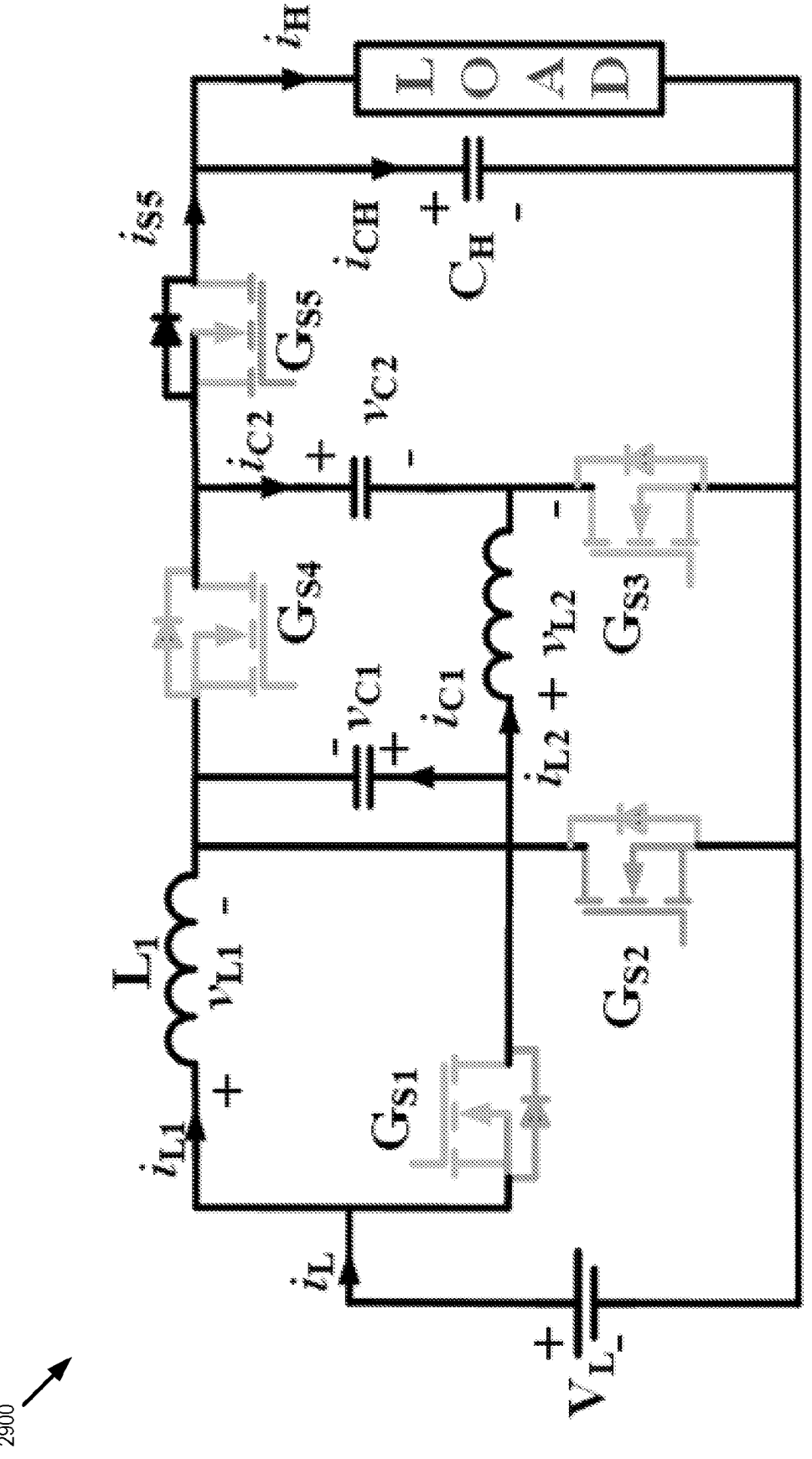
FIG. 29 is a circuit diagram of a bidirectional DC-DC converter operating in a third zone of a fourth mode of a type III PWM boost operation.

FIG. 29 is a circuit diagram 2900 of a bidirectional DC-DC converter 102 operating in a third zone of a fourth mode of a type III PWM boost operation. The third mode can be characterized by a time interval of $(0.5+D)$ T≤t≤T. As soon as switch $G_{S3}$ is turned OFF, the body diode of the switches $G_{S1}$, $G_{S2}$ and $G_{S4}$ become reversed biased and stop conduction. The inductors voltage equation and capacitor current equations are $$v_{L1} + v_{L2} = v_L + v_{C1} - v_H$$

$$i_{CH} = i_{L2} - i_H$$

$$i_{C2} = -i_{L2}$$

$$i_{C1} = -i_{L2} = -i_{L1}$$

Applying a volt-second balance across inductors $L_1$ and $L_2$, the voltage across capacitors $C_1$ and $C_2$ and the converter gain can be represented by:

$$V_{C1} = V_L, \ V_{C2} = 0, \ V_H = \frac{2V_L}{(1-D)}$$

The application of charge balance in capacitors can give:

$$I_{L1} = \frac{2I_H}{(1-D)}, \ I_{L2} = \frac{I_H}{(1-D)}, \ \text{and} \ I_H = \frac{(1-D)I_L}{2}$$

The voltage stress across each switch and current stress through the switches can be represented by:

$$
\left.
\begin{aligned}
V_{S1} &= \frac{2V_L}{(1-D)} \\
V_{S2} &= \frac{2V_L}{(1-D)} \\
V_{S3} &= \frac{2V_L}{(1-D)} \\
V_{S4} &= \frac{2V_L}{(1-D)} \\
V_{S5} &= \frac{2V_L}{(1-D)}
\end{aligned}
\right\}
\text{ and }
\left.
\begin{aligned}
I_{S1} &= \frac{2I_H}{(1-D)} \\
I_{S2} &= \frac{3I_H}{(1-D)} \\
I_{S3} &= \frac{2I_H}{(1-D)} \\
I_{S4} &= \frac{I_H}{(1-D)} \\
I_{S5} &= \frac{I_H}{(1-D)}
\end{aligned}
\right\}
$$

Figure 30:
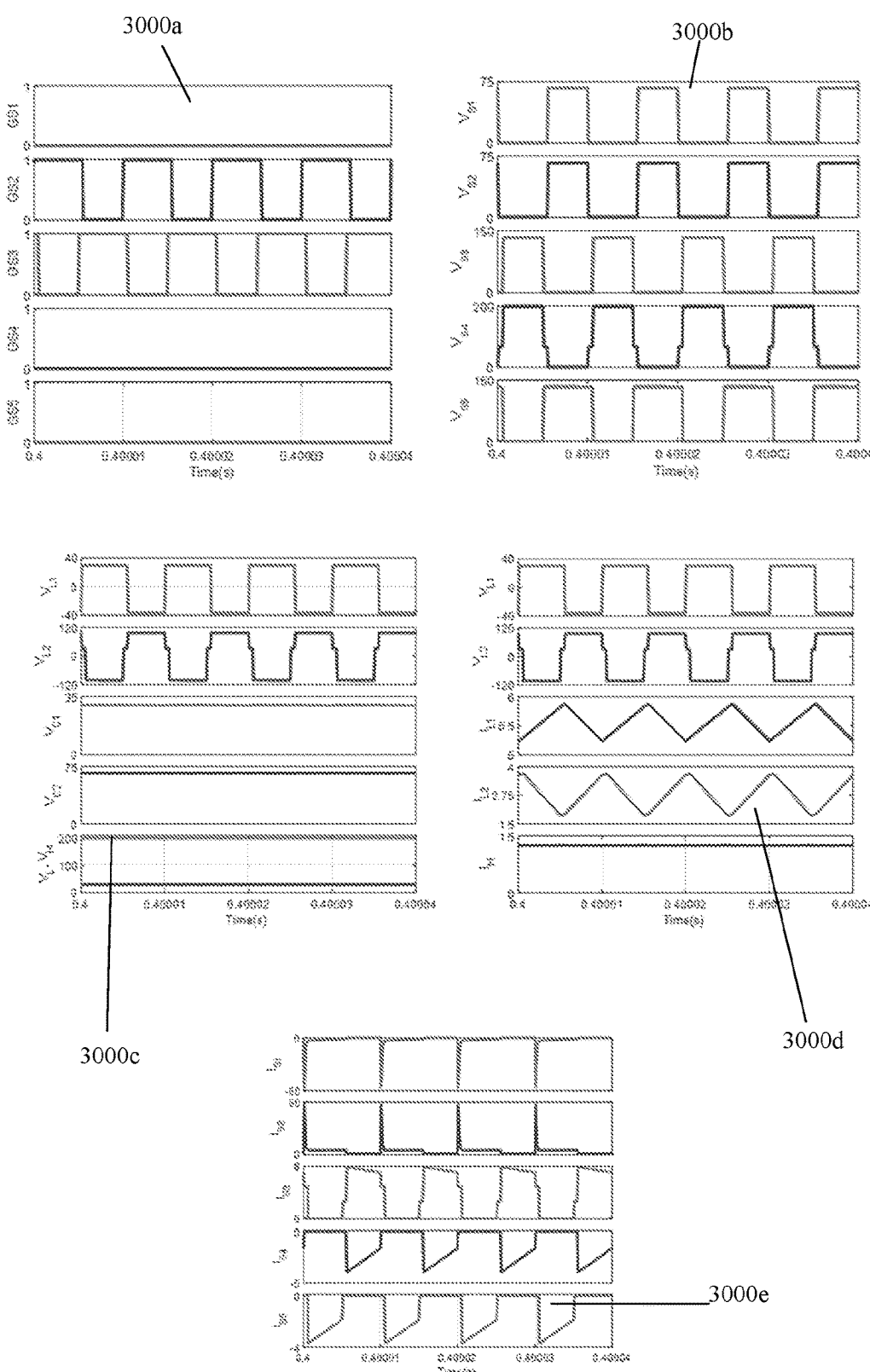
FIG. 30 is a set of plots of gate, voltage, and current waveforms for a PWM type III boost operational mode for a bidirectional DC-DC converter.

FIG. 30 is a set of plots 3000a-e of gate, voltage, and current waveforms for a PWM type III boost operational mode for a bidirectional DC-DC converter 102. Each plot can include a horizontal axis 3002 that can represent time and a vertical axis 3004 that can represent waveforms (e.g., for gating, voltage, current, etc.) for the components of the bidirectional DC-DC converter 102. The plot 3000a can be a plot of gate pulse of the switches versus time, the plots 3000b-c can be plots of voltage waveform of the inductors, capacitors, and switches versus time, and the plots 3000d-e can be plots of current waveform of the inductors, capacitors, and switches versus time.

For the buck operational mode of the bidirectional DC-DC converter 102, the switches $G_{S1}$, $G_{S4}$, and $G_{S5}$ are controlled (e.g., turned on, etc.) using PWM types, while the switches $G_{S2}$ and $G_{S3}$ are permanently OFF. Depending on the switching pulses used for the switches $G_{S1}$, $G_{S4}$ and $G_{S5}$, the body diodes of $G_{S2}$ and $G_{S3}$ can conduct. The buck operation this converter can be achieved with two different PWM types: type I and type II.

In buck operational mode with PWM type I, the gate pulse for switches $G_{S1}$ and $G_{S4}$ are complementary of that for $G_{S5}$. Therefore, the bidirectional DC-DC converter 102 can operate in two modes. Mode 1 can involve the switch $G_{S5}$ being ON, and the switches $G_{S1}$ and $G_{S5}$ being OFF for DT interval. Mode 2, for $(1-D)T$ interval, can involve the switch $G_{S5}$ being OFF and the switches $G_{S1}$ and $G_{S4}$ being ON.

Figure 31:
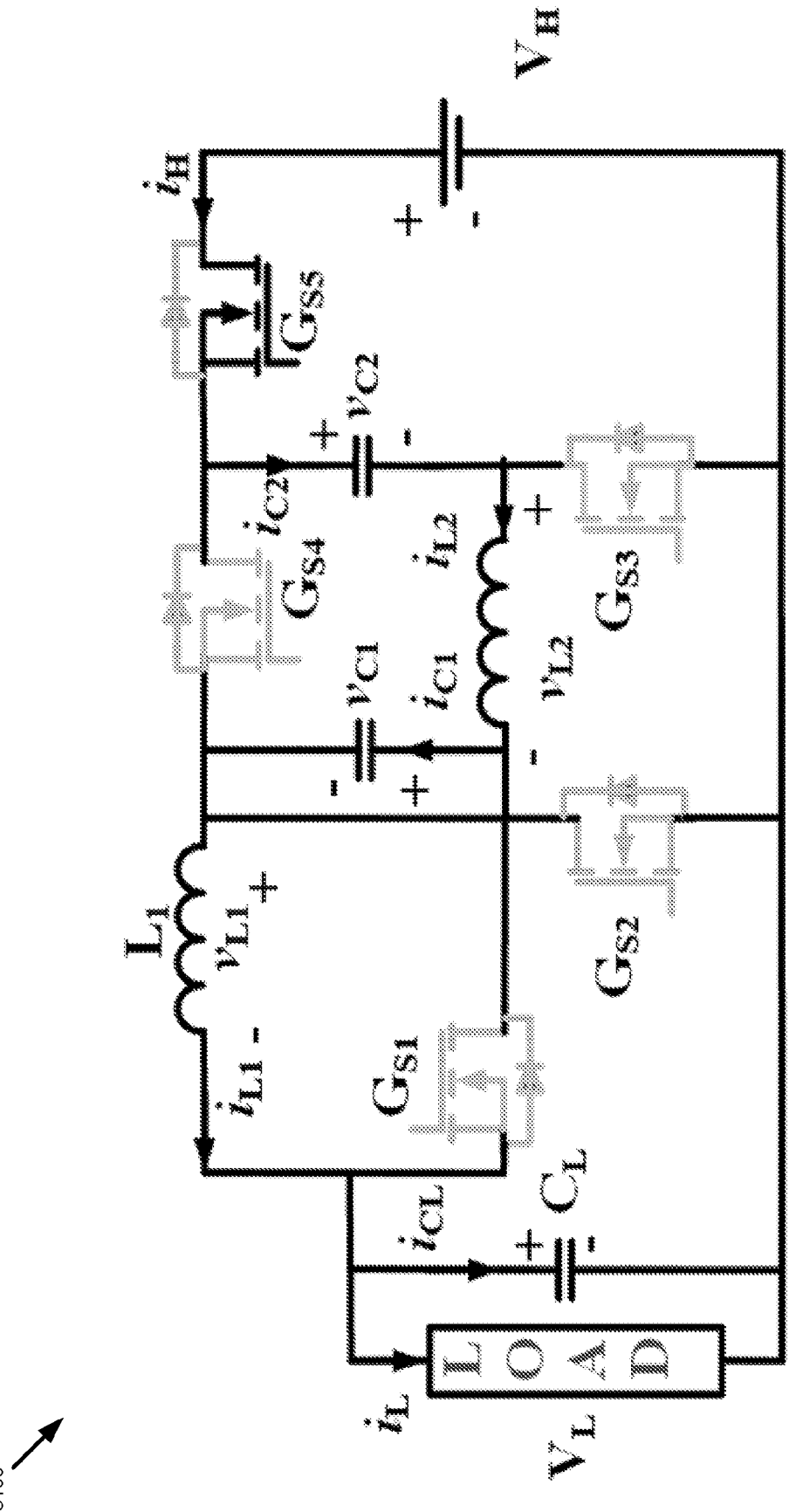
FIG. 31 is a circuit diagram of a bidirectional DC-DC converter operating in a first mode of a type I PWM buck operation.

FIG. 31 is a circuit diagram 3100 of a bidirectional DC-DC converter 102 operating in a first mode of a type I PWM buck operation. The first mode can be characterized by a time interval of 0≤t<DT. When a gate of the switch $G_{S5}$ is turned ON and the switches $G_{S1}$ and $G_{S5}$ are turned OFF for DT, the body diodes of the switches $G_{S2}$ and $G_{S3}$ become open circuited. Accordingly, the equations for the inductor voltages and capacitor currents can include:

$$v_{L1} + v_{L1} = v_h - v_{c1} - v_{c2} - v_L$$

$$i_{C2} = i_H = i_{L2} = i_{L1} = i_{C1}$$

$$i_{CL} = i_{L1} - i_L$$

Figure 32:
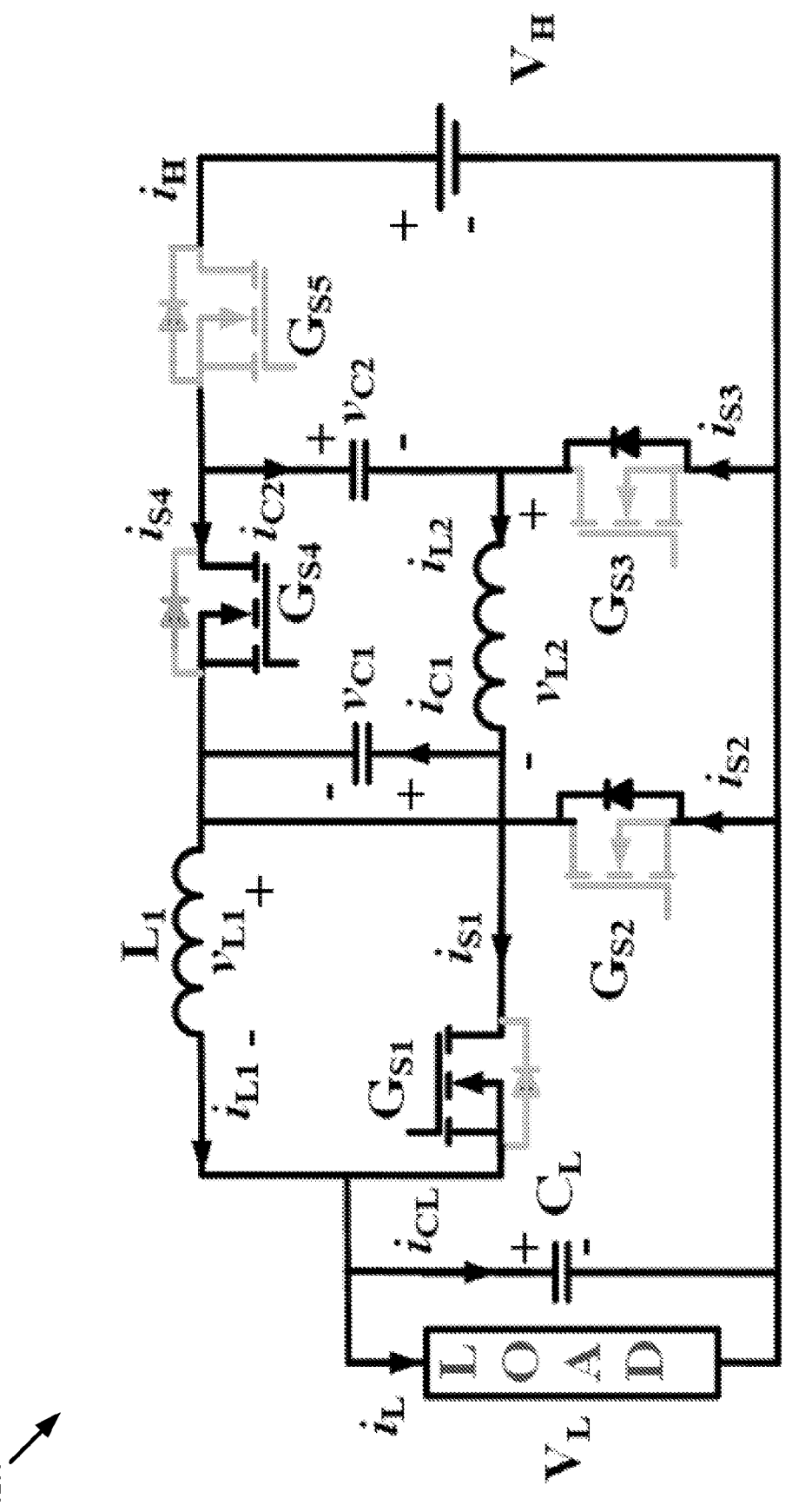
FIG. 32 is a circuit diagram of a bidirectional DC-DC converter operating in a second mode of a type I PWM buck operation.

FIG. 32 is a circuit diagram 3200 of a bidirectional DC-DC converter 102 operating in a second mode of a type I PWM buck operation. The second mode can be characterized by a time interval of DT≤t<T. In the second mode of operation, the switch $G_{S5}$ is OFF and the switches $G_{S1}$ and $G_{S4}$ are ON. Accordingly, the body diodes of the switches $G_{S2}$ and $G_{S3}$ begin to conduct. The following equations can be obtained:

$$v_{L1} = -v_L$$

$$v_{L2} = -v_{C1} - v_{C2}$$

$$v_{C1} = v_L$$

$$v_L = v_{C1} + v_{C2}$$

$$i_{C2} = -i_{S4} = i_{L2} - i_{S3}$$

$$i_{C1} = i_{L1} - i_{S2} - i_{S4} = i_{L2} - i_{S1}$$

$$i_{CL} = i_{L1} + i_{S1} - i_L = i_{S2} + i_{S3} - i_L$$

In steady state, the capacitor average current and inductor average voltage over one switching interval can be zero. By utilizing volt-seconds balance principle to the $L_1$ and $L_2$ over one switching interval, the following voltage relations can be determined:

$$V_{C1} = \frac{DV_H}{2}, \; V_{C2} = 0, \; V_L = \frac{DV_H}{2}$$

By implementing the charge-seconds balance principle to the capacitors over one switching interval, the following current relations can be determined:

$$I_{L1} - I_{L2} = \frac{I_H}{D} \text{ and } I_L = \frac{2I_H}{D}$$

The maximum voltage and current rating of the switches can be represented as:

$$\left. \begin{array}{l} V_{S1} = \dfrac{V_H}{2} \\ V_{S2} = \dfrac{V_H}{2} \\ V_{S3} = V_H \\ V_{S4} = \dfrac{V_H}{2} \\ V_{S5} = V_H \end{array} \right\} \text{ and } \left. \begin{array}{l} I_{S1} = \dfrac{I_H}{D(1-D)} \\ I_{S2} = \dfrac{I_H}{D} \\ I_{S3} = \dfrac{(1-2D)I_H}{D(1-D)} \\ I_{S4} = \dfrac{I_H}{(1-D)} \\ I_{S5} = I_H \end{array} \right\}$$

Figure 33:
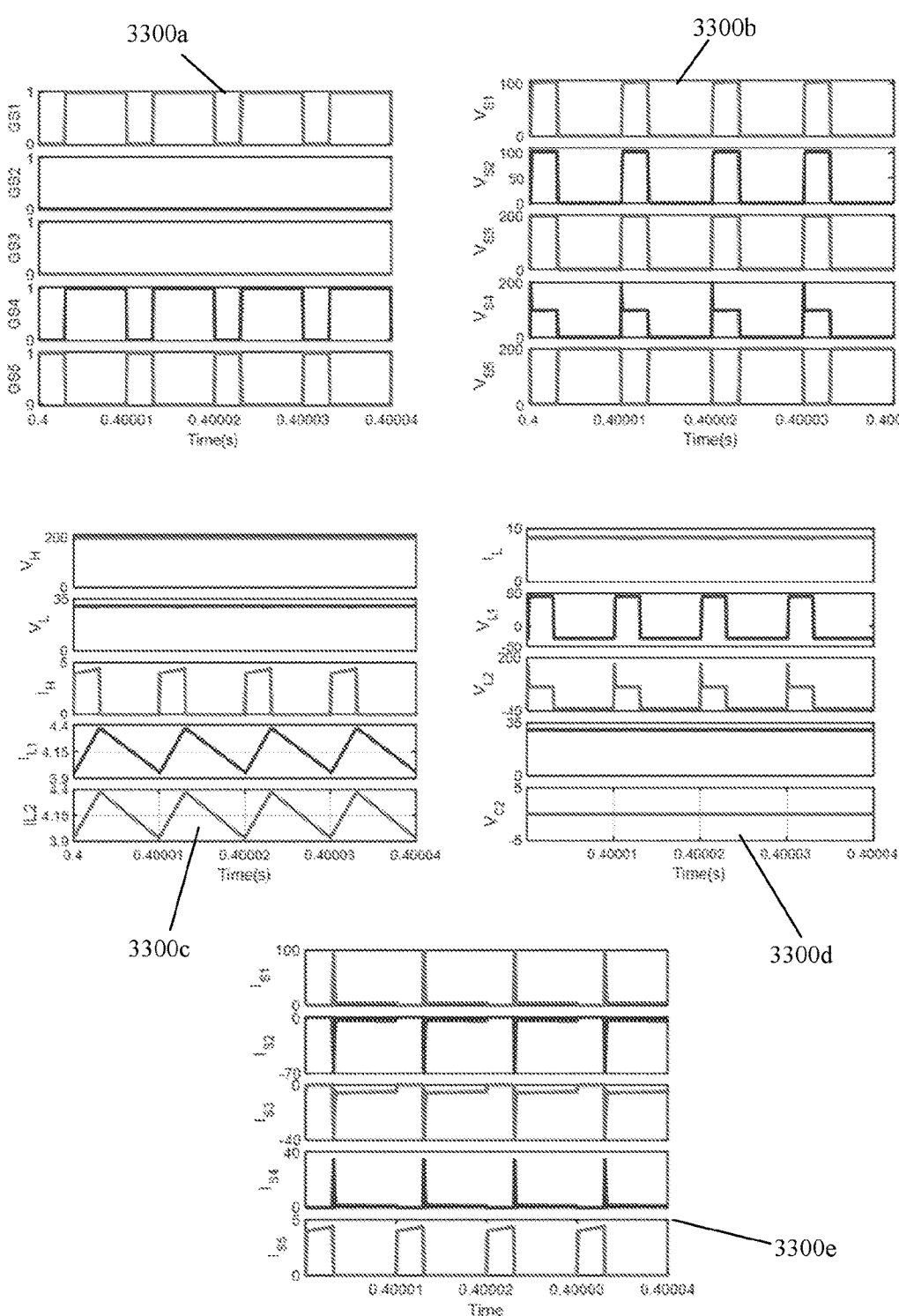
FIG. 33 is a set of plots of gate, voltage, and current waveforms for a PWM type I buck operational mode for a bidirectional DC-DC converter.

FIG. 33 is a set of plots of gate, voltage, and current waveforms for a PWM type I buck operational mode for a bidirectional DC-DC converter 102. Each plot can include a horizontal axis 3302 that can represent time and a vertical axis 3304 that can represent waveforms (e.g., for gating, voltage, current, etc.) for the components of the bidirectional DC-DC converter 102. The plot 3300a can be a plot of gate pulse of the switches versus time, the plots 3300b-c can be plots of voltage waveform of the inductors, capacitors, and switches versus time, and the plots 3300d-e can be plots of current waveform of the inductors, capacitors, and switches versus time.

Buck operational mode with PWM type II can generate a synchronized gate pulse for the switches $G_{S5}$ and $G_{S1}$ while the pulse for $G_{S4}$ is complementary to that of $G_{S5}$. Therefore, the bidirectional DC-DC converter 102 can operate in two modes. Mode 1 can involve the switches $G_{S5}$ and $G_1$ being ON and the switch $G_{S4}$ being OFF for DT interval. Mode 2 can involve, for the (1-D)T interval, the switch $G_{S4}$ being ON and the switches $G_{S1}$ and $G_{S5}$ being OFF.

Figure 34:
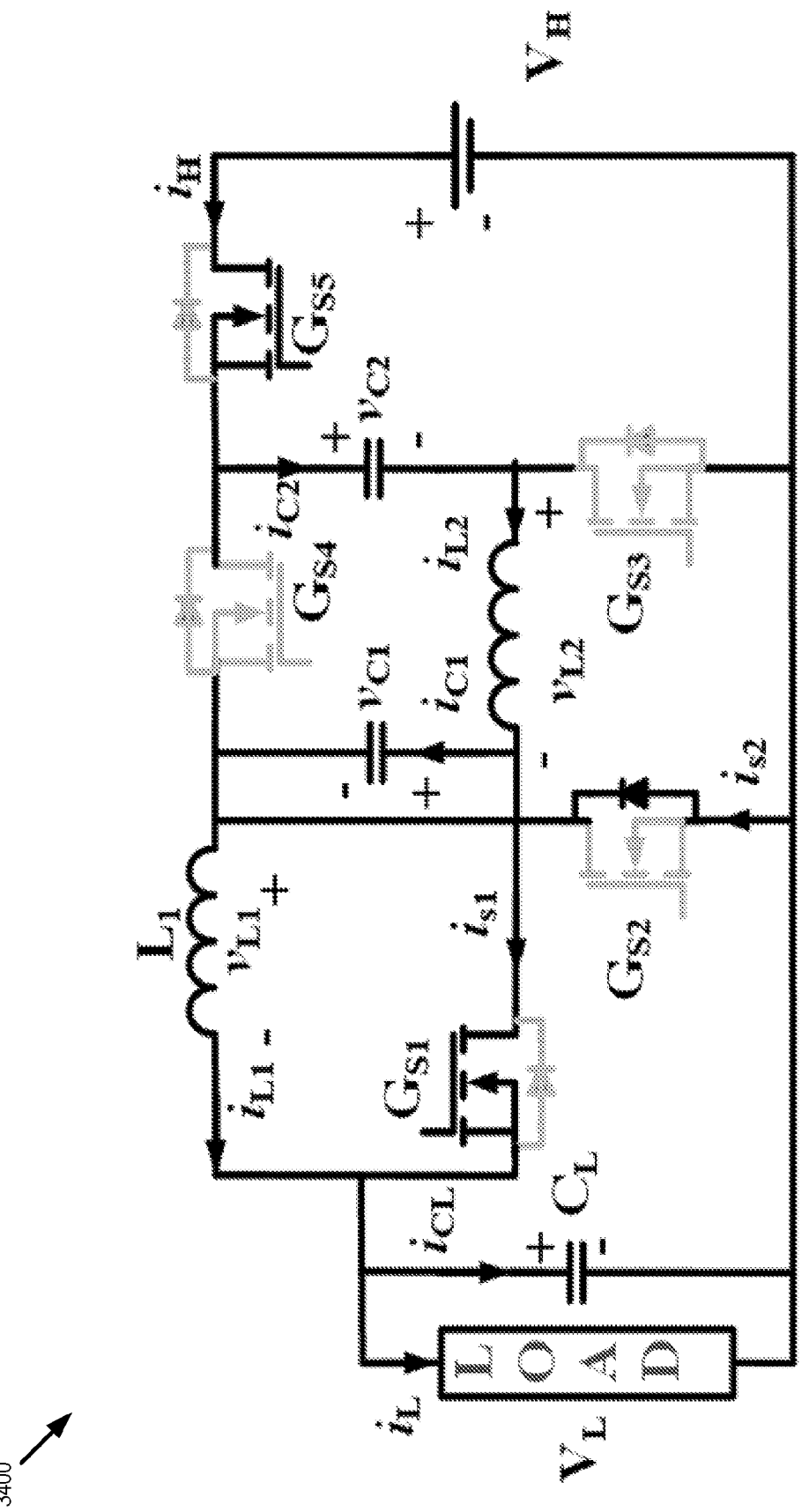
FIG. 34 is a circuit diagram of a bidirectional DC-DC converter operating in a first mode of a type II PWM buck operation.

FIG. 34 is a circuit diagram 3400 of a bidirectional DC-DC converter 102 operating in a first mode of a type II PWM buck operation. The first mode can be characterized by a time interval of 0≤t<DT. When the gate of the switches $G_{S5}$ and $G_{S1}$ are turned ON and the switch $G_{S4}$ is turned OFF for DT, the body diode of the switch $G_{S2}$ beings to conduct, while the body diode of the switch $G_{S3}$ remains reversed biased. The following equations can be obtained:

$$v_{L1} = -v_L$$

$$v_{c1} = v_L$$

$$v_{L2} = v_H - v_{C1} - v_{C2}$$

which can alternatively be written as:

$$i_{C2} = i_H = i_{L2}$$

-continued $$i_{C1} - i_{S1} + i_{L2} = -i_{S2} + i_{L1}$$

$$i_{CL} = -i_L + i_{L1} + i_{S1} = i_{S2} + i_H - i_L$$

Figure 35:
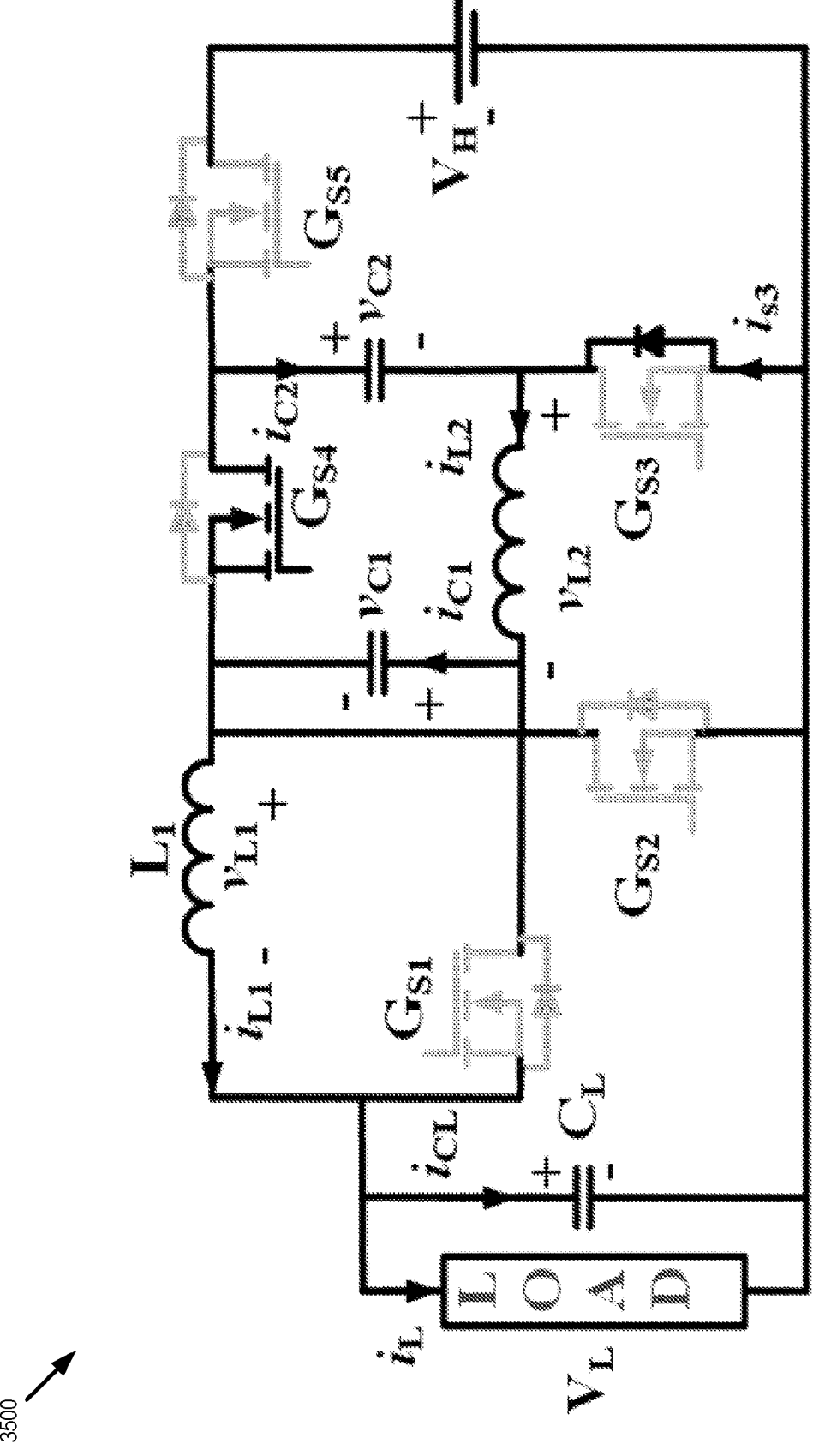
FIG. 35 is a circuit diagram of a bidirectional DC-DC converter operating in a second mode of a type II PWM buck operation.

FIG. 35 is a circuit diagram 3500 of a bidirectional DC-DC converter 102 operating in a second mode of a type II PWM buck operation. The second mode can be characterized by a time interval of DT≤t<T. In the second mode of operation, the switch $G_{S5}$ and $G_{S1}$ are turned OFF and the switches $G_{S4}$ are turned ON. Accordingly, the body diodes of the switch $G_{S2}$ reversed biased and the switch $G_{S3}$ can begin to conduct. The following equations can be obtained:

$$v_{L1} = v_{C2} - v_L$$

$$v_{L21} = -v_{C2} - v_{C1}$$

$$i_{CL} = i_{L1} - i_L$$

$$i_{C2} = i_{L2} - i_{L1}$$

$$i_{C1} = i_{L2}$$

By applying the volt-seconds balance principle to the inductors $L_1$ and $L_2$ over one switching interval, the following voltage relations can be obtained:

$$V_{C1} = V_L, \; V_{C2} = \frac{V_L}{(1-D)}, \; V_L = \frac{D(1-D)V_H}{(2-D)}$$

By applying the charge second balance principle to the capacitors, the following current relations can be obtained:

$$I_{L1} = \frac{I_H}{D(1-D)}, \; I_{L2} = \frac{I_H}{D}, \text{ and } I_H = \frac{D(1-D)I_L}{(2-D)}$$

The maximum voltage and current rating of the switches can be determined as:

$$\left. \begin{array}{l} V_{S1} = \dfrac{V_L}{(1-D)} \\ V_{S2} = \dfrac{V_L}{(1-D)} \\ V_{S3} = \dfrac{2V_H}{D} \\ V_{S4} = \dfrac{D(1-D)V_L}{(2-D)} \\ V_{S5} = \dfrac{D(1-D)V_L}{(2-D)} \end{array} \right\} \text{ and } \left. \begin{array}{l} I_{S1} = \dfrac{I_H}{D^2} \\ I_{S2} = \dfrac{(D^2-D+1)I_H}{D^2(1-D)} \\ I_{S3} = \dfrac{I_H}{D(1-D)} \\ I_{S4} = \dfrac{(D^2-D+1)I_H}{D^2(1-D)} \\ I_{S5} = \dfrac{I_H}{D} \end{array} \right\}$$

Figure 36:
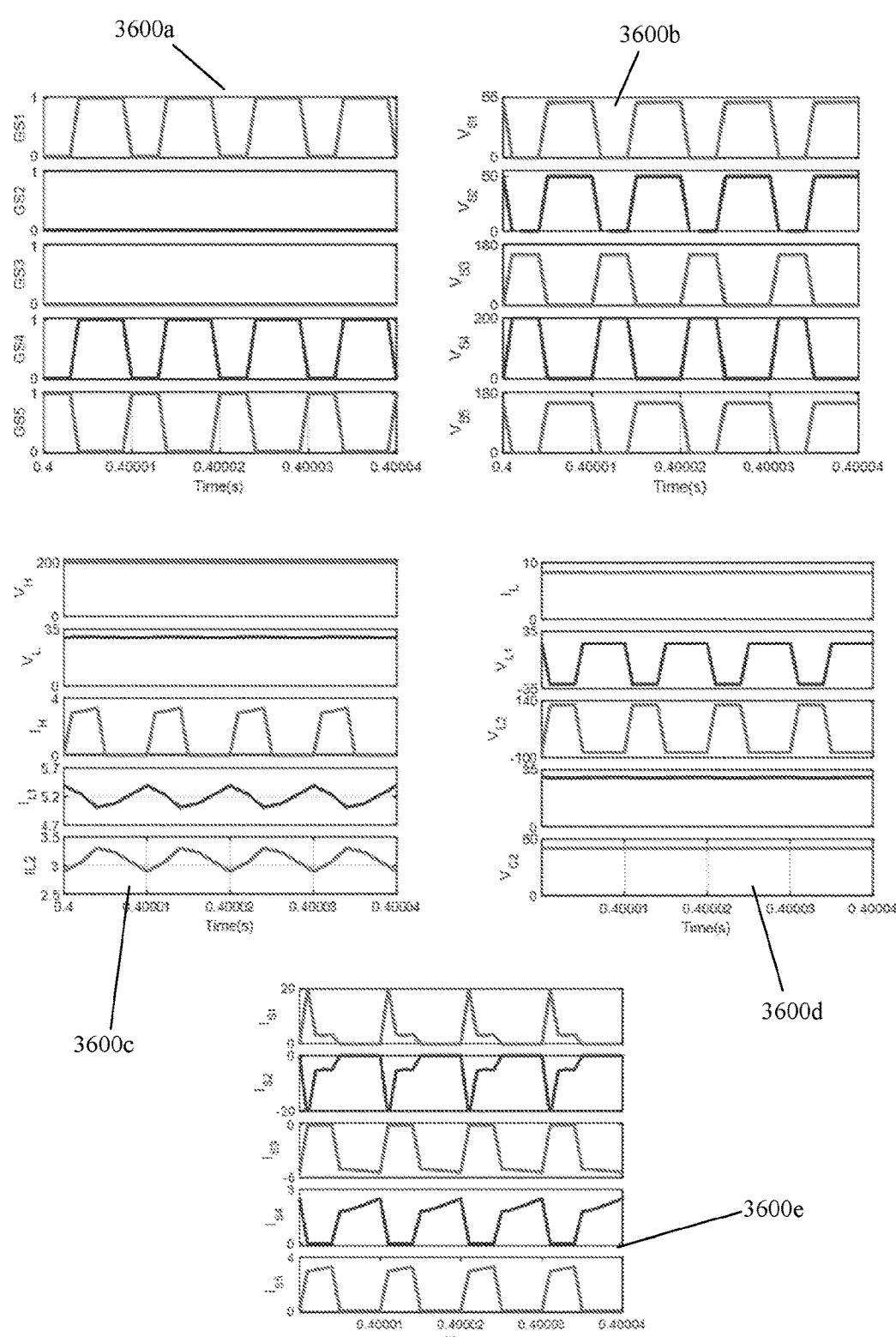
FIG. 36 is a set of plots of gate, voltage, and current waveforms for a PWM type II buck operational mode for a bidirectional DC-DC converter.

FIG. 36 is a set of plots of gate, voltage, and current waveforms for a PWM type II buck operational mode for a bidirectional DC-DC converter 102. Each plot can include a horizontal axis 3602 that can represent time and a vertical axis 3604 that can represent waveforms (e.g., for gating, voltage, current, etc.) for the components of the bidirectional DC-DC converter 102. The plot 3600a can be a plot of gate pulse of the switches versus time, the plots 3600b-c can be plots of voltage waveform of the inductors, capacitors, and switches versus time, and the plots 3600d-e can be plots of current waveform of the inductors, capacitors, and switches versus time.

For operating the bidirectional DC-DC converter 102 in continuous conduction mode (CCM), values of inductors and capacitors can be selected so that the current ripple in inductors and the voltage ripple in the capacitors are within the desired value. Operating the converter below the desired value can lead to a discontinuous conduction mode in the converter. The selection of voltage and current rating of switches can be based on peak reverse voltage across the switches as well as peak current through the switches.

The capacitors and inductors may be designed to limit the ripple voltage and switching frequency current ripple. Accordingly, for the bidirectional DC-DC converter 102, the values for the inductors and the capacitors can be obtained by:

$$L_i = \frac{DV_{Li}}{\Delta i_{Li} I_{Li} f_s}$$

$$C_i = \frac{DI_{ci}}{\Delta V_{ci} V_{ci} f_s}$$

in which i=1 and 2, $V_{L1}$ and $V_{L2}$ are the voltages across the inductors $L_1$ and $L_2$, $I_{L1}$ and $I_{L2}$ are the currents flowing through $L_1$ and $L_2$, $\Delta i_{L1}$ and $\Delta i_{L2}$ represent percentage ripple currents in $L_1$ and $L_2$ during shoot-through interval D, $V_{c1}$ and $V_{c2}$ are the voltages across the capacitors $C_1$ and $C_2$, $I_{c1}$ and $I_{c2}$ are the currents flowing through $C_1$ and $C_2$, $\Delta V_{c1}$ and $\Delta V_{c2}$ represent percentage ripple voltages in $C_1$ and $C_2$, and $f_s$ is the switching frequency. The design procedures for all the control strategies can be similar or identical. As the converter is bi-directional, the design percentage ripple can be similar or identical for boost mode of operation as well as for buck mode of operation. The corresponding voltage and current expressions of capacitors and inductors can be determined as:

$$L_1 = \frac{D^2(1-D)V_L}{\Delta i_{L1} f_s I_H}$$

$$L_2 = \frac{D(2-D)V_L}{\Delta i_{L2} f_s I_H}$$

$$C_1 = \frac{I_H}{\Delta v_{c1} f_s (1-D)V_L}$$

$$C_2 = \frac{(1-D)I_H}{\Delta v_{c2} f_s V_L}$$

$$C_H = \frac{D^2(1-D)I_H}{\Delta v_{cH} f_s (2-D)V_L}$$

where $\Delta i_{L1}$, $\Delta i_{L2}$ are the percentage current ripple of the inductors $L_1$ and $L_2$, respectively and $\Delta V_{C1}$ and $\Delta V_{C2}$ are the voltage ripple of the capacitors $C_1$ and $C_2$, respectively.

For buck mode, $C_L$ can be the filter capacitor across the load or output terminals and can be given by:

$$C_L = \frac{(1-D)I_H}{\Delta v_{cL} f_s D(2-D)V_L}$$

where $\Delta V_{CL}$ is the voltage ripple across $C_L$.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below.

EXAMPLES

In the following sections, further exemplary embodiments are provided.

Example 1 includes a bidirectional direct current-to-direct current (DC-DC) converter comprising: at least one of a boost or a buck converter that comprises a set of inductors, a set of capacitors, and a plurality of switches; and a control unit configured to: activate the boost converter by turning ON first switches of the plurality of switches and turning OFF remaining second switches of the plurality of switches, and activate the buck converter by turning OFF the first switches and turning ON the remaining second switches.

Example 2 includes a bidirectional DC-DC converter of example 1, wherein: a first inductor of the set of inductors is electrically connected with a first voltage side of the DC-DC converter, a first set of switches of the plurality of switches, and a first capacitor of the set of capacitors, a second inductor of the set of inductors is electrically connected with a second set of switches of the plurality of switches, the first capacitor, and a second capacitor of the set of capacitors, the first set of switches and the second set of switches share at least a first switch, an additional switch of the plurality of switches is not included in the first set and the second set of switches and is electrically connected to the second capacitor and to a second voltage side of the DC-DC converter, and the first voltage side and the second voltage side share a common ground.

Example 3 includes a bidirectional DC-DC converter of example 2, wherein the first switch is electrically connected to the first voltage side, and wherein a second switch of the first set of switches is electrically connected to the common ground.

Example 4 includes a bidirectional DC-DC converter of example 3, wherein a third switch of the second set of switches is electrically connected to the common ground.

Example 5 includes a bidirectional DC-DC converter of example 4, wherein a fourth switch of the first set of switches is electrically connected to the first capacitor, the second capacitor, and the additional switch.

Example 6 includes a bidirectional DC-DC converter of any preceding example 1-5, wherein at least one switch of the plurality of switches comprises a MOSFET and a diode, wherein a gate terminal of the MOSFET is electrically coupled with a pulse width modulation (PWM) voltage source, and wherein the diode is electrically connected to remaining terminals of the transistor.

Example 7 includes a bidirectional DC-DC converter of any preceding example 1-6, wherein operational modes of the DC-DC converter comprises a boost operational mode during which the boost converter is activated and a buck operational mode during which the buck converter is activated.

Example 8 includes a bidirectional DC-DC converter of example 7, wherein the first set of switches and the second set of switches share at least a first switch, wherein an additional switch of the plurality of switches is not included in the first set and the second set of switches, and wherein in the boost operational mode, pulse width modulation (PWM) pulses are supplied to a second switch of the first set of switches and a third switch of the second set of switches while the additional switch, the first switch, and a fourth switch of the first set of switches are turned OFF.

Example 9 includes a bidirectional DC-DC converter of example 8, wherein the second switch and the third switch are electrically connected to the common ground.

Example 10 includes a bidirectional DC-DC converter of any preceding example 8-9, wherein first PWM pulses supplied to the second switch are complementary to second PWM pulses supplied to the third switch.

Example 11 includes a bidirectional DC-DC converter of any preceding example 8-9, wherein first PWM pulses supplied to the second switch are synchronized with second PWM pulses supplied to the third switch.

Example 12 includes a bidirectional DC-DC converter of any preceding example 8-9, wherein first PWM pulses supplied to the second switch and second PWM pulses supplied to the third switch are out phase.

Example 13 includes a bidirectional DC-DC converter of example 7, wherein the first set of switches and the second set of switches share at least a first switch, wherein an additional switch of the plurality of switches is not included in the first set and the second set of switches, and wherein in the buck operational mode, a second switch of the first set of switches and a third switch of the second set of switches are turned OFF while PWM pulses are supplied to the additional switch and to the first switch and fourth switch of the first set of switches.

Example 14 includes a bidirectional DC-DC converter of example 13, wherein first PWM pulses supplied to the first switch and the fourth switch are synchronized and complimentary to second PWM pulses supplied to the additional switch.

Example 15 includes a bidirectional DC-DC converter of example 13, wherein first PWM pulses supplied to the first switch are synchronized with second PWM pulses supplied to the additional switch and are complementary to third PWM pulses supplied to the fourth switch.

Example 16 includes a method of operating a bidirectional direct current-to-direct current (DC-DC) converter, the method comprising: turning ON first switches of the DC-DC converter to operate the DC-DC converter in a boost operational mode, wherein the DC-DC converter comprises: at least one of a boost or a buck converter that comprises a set of inductors, a set of capacitors, and a plurality of switches; and a control unit configured to: activate the boost converter by turning ON first switches of the plurality of switches and turning OFF remaining second switches of the plurality of switches, and activate the buck converter by turning OFF the first switches and turning ON the remaining second switches; and turning OFF the remaining second switches of the DC-DC converter.

Example 17 includes a method of example 16, wherein the DC-DC converter is operated in the boost operational mode by at least supplying PWM pulses to the first switches.

Example 18 includes a method of example 16, further comprising: turning OFF the first switches of the DC-DC converter to operate the DC-DC converter in a buck operational mode; and turning ON the remaining second switches of the DC-DC converter.

Example 19 includes a system comprising: a voltage source; a load; and a bidirectional direct current-to-direct current (DC-DC) converter electrically coupled to the voltage source and the load, wherein the DC-DC converter comprises: at least one of a boost or a buck converter that comprises a set of inductors, a set of capacitors, and a plurality of switches; a control unit configured to activate: the boost converter by turning ON first switches of the plurality of switches and turning OFF remaining second switches of the plurality of switches, and activate the buck converter by turning OFF the first switches and turning ON the remaining second switches.

Example 20 includes a system of example 19, wherein the load comprises an electric vehicle load or a hybrid electric vehicle load.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations, and modifications will become apparent to those skilled in the art once the above disclosure is fully appreciated. It is intended that the following claims be interpreted to embrace all such variations and modifications.

What is claimed is:

1. A bidirectional direct current-to-direct current (DC-DC) converter comprising:
   at least one of a boost converter or a buck converter that comprises a set of inductors, a set of capacitors, and a plurality of switches, wherein:
   a first inductor of the set of inductors is electrically connected with a first switch and a second switch of a first set of switches of the plurality of switches, a first switch of a second set of switches of the plurality of the switches, and a first capacitor of the set of capacitors;
   a second inductor is electrically connected with a second switch of the second set of switches, the first switch of the first set of switches, the first capacitor, and a second capacitor of the set of capacitors; and
   the second switch and a third switch of the first set of switches are electrically connected to the second capacitor; and
   a control unit configured to:
   activate the boost converter by turning ON the second set of switches of the plurality of switches and turning OFF the first set of switches of the plurality of switches, and
   activate the buck converter by turning OFF the second set of switches and turning ON the first set of switches.

2. The bidirectional DC-DC converter of claim 1, wherein:
   the first inductor is also electrically connected with a first voltage side of the bidirectional DC-DC converter and a second switch of the first set of switches,
   a second inductor is electrically connected with second switch of the first set of switches, the first capacitor, a second capacitor and second switch of the second set of switches,
   the first voltage side and a second voltage side of the bidirectional DC-DC converter share a common ground.

3. The bidirectional DC-DC converter of claim 2, wherein the second switch of the first set of switches is electrically connected to the first voltage side, and wherein a first switch of the second set of switches is electrically connected to the common ground.

4. The bidirectional DC-DC converter of claim 3, wherein a second switch of the second set of switches is electrically connected to the common ground.

5. The bidirectional DC-DC converter of claim 4, wherein a second switch of the first set of switches is electrically connected to the first capacitor, and the second capacitor.

6. The bidirectional DC-DC converter of claim 1, wherein at least one switch of the plurality of switches comprises a transistor and a diode, wherein a gate terminal of the transistor is electrically coupled with a pulse width modulation (PWM) voltage source, and wherein the diode is electrically connected to remaining terminals of the transistor.

7. The bidirectional DC-DC converter of claim 1, wherein operational modes of the DC-DC converter comprise a boost operational mode during which the boost converter is activated and a buck operational mode during which the buck converter is activated.

8. The bidirectional DC-DC converter of claim 7, herein in the boost operational mode, pulse width modulation (PWM) pulses are supplied to both switches of the second set of switches hile and all switches of the first set of switches are turned OFF.

9. The bidirectional DC-DC converter of claim 8, wherein the both the switches of the second set of switches of the plurality of switches are electrically connected to a common ground.

10. The bidirectional DC-DC converter of claim 8, wherein first PWM pulses supplied to the first switch of the second set of switches of the plurality of switches are complementary to second PWM pulses supplied to the second switch of the second set of switches of the plurality of switches.

11. The bidirectional DC-DC converter of claim 8, wherein first PWM pulses supplied to the first switch of the second set of switches of the plurality of switches are synchronized with second PWM pulses supplied to the second switch of the second set of switches of the plurality of switches.

12. The bidirectional DC-DC converter of claim 8, wherein first PWM pulses supplied to the first switch of the second set of switches of the plurality of switches and second PWM pulses supplied to the second switch of the second set of switches of the plurality of switches are out phase.

13. The bidirectional DC-DC converter of claim 7, and wherein in the buck operational mode, both the switches of the second set of the switches of the plurality of switches are turned OFF while PWM pulses are supplied to all the switches of the first set switches of the plurality of switches.

14. The bidirectional DC-DC converter of claim 13, wherein first PWM pulses are supplied to the first switch and the second switch of the first set of switches of the plurality of switches are synchronized and complimentary to second PWM pulses supplied to the third switch of the first set of switches.

15. The bidirectional DC-DC converter of claim 13, wherein first PWM pulses supplied to the first switch and third switch of the first set of switches of the plurality of switches are synchronized and are complementary to second PWM pulses supplied to the second switch of the first set of switches of the plurality of switches.

16. A method of operating a direct current-to-direct current (DC-DC) converter, the method comprising:
    turning ON a second set of switches of a plurality of switches second set of the switches of the DC-DC converter to operate the DC-DC converter in a boost operational mode, wherein the DC-DC converter comprises:

at least one of a boost or a buck converter that comprises a set of inductors, a set of capacitors, and a plurality of switches, wherein:
        a first inductor of the set of inductors is electrically connected with a first switch and a second switch of a first set of switches of the plurality of switches, a first switch of a second set of switches of the plurality of the switches, and a first capacitor of the set of capacitors;
        a second inductor is electrically connected with a second switch of the second set of switches, the first switch of the first set of switches, the first capacitor, and a second capacitor of the set of capacitors; and
        the second switch and a third switch of the first set of switches are electrically connected to the second capacitor; and
    a control unit configured to:
        activate the boost converter by turning ON second set of switches of the plurality of switches and turning OFF all switches of the first set of switches, and
        activate the buck converter by turning OFF the second set of switches of the plurality of switches and turning ON all switches of the first set of switches of the plurality of switches.

17. The method of claim 16, wherein the DC-DC converter is operated in the boost operational mode by at least supplying PWM pulses to the second set switches of the plurality of switches.

18. The method of claim 16, further comprising:
    turning OFF the second set switches of the plurality of switches of the DC-DC converter to operate the DC-DC converter in a buck operational mode; and
    turning ON the all the switches of the first set of switches of the plurality of switches of the DC-DC converter.

19. A system comprising:
    a voltage source;
    a load; and
    a bidirectional direct current-to-direct current (DC-DC) converter electrically coupled to the voltage source and the load, wherein the DC-DC converter comprises:
        at least one of a boost converter or a buck converter that comprises a set of inductors, a set of capacitors, and a plurality of switches, wherein:
            a first inductor of the set of inductors is electrically connected with a first switch and a second switch of a first set of switches of the plurality of switches, a first switch of a second set of switches of the plurality of the switches, and a first capacitor of the set of capacitors;
            a second inductor is electrically connected with a second switch of the second set of switches, the first switch of the first set of switches, the first capacitor, and a second capacitor of the set of capacitors; and
            the second switch and a third switch of the first set of switches are electrically connected to the second capacitor; and
        a control unit configured to:
            activate the boost converter by turning ON the second set of switches of the plurality of switches and turning OFF the first set of switches of the plurality of switches, and
            activate the buck converter by turning OFF the second set of switches and turning ON the first set of switches.

20. The system of claim 19, wherein the load comprises an electric vehicle load or a hybrid electric vehicle load.

* * * * *